United States Patent
Orii et al.

(10) Patent No.: US 10,991,335 B2
(45) Date of Patent: Apr. 27, 2021

(54) DISPLAY DEVICE AND ELECTRONIC APPARATUS

(71) Applicant: SONY SEMICONDUCTOR SOLUTIONS CORPORATION, Kanagawa (JP)

(72) Inventors: Toshihiko Orii, Kanagawa (JP); Hiroshi Nakao, Kanagawa (JP); Naoki Andou, Kanagawa (JP); Kazuhiro Takeda, Fukuoka (JP); Keiko Kawaguchi, Fukuoka (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/765,597

(22) PCT Filed: Oct. 16, 2018

(86) PCT No.: PCT/JP2018/038409
§ 371 (c)(1),
(2) Date: May 20, 2020

(87) PCT Pub. No.: WO2019/106989
PCT Pub. Date: Jun. 6, 2019

(65) Prior Publication Data
US 2020/0312263 A1 Oct. 1, 2020

(30) Foreign Application Priority Data

Nov. 28, 2017 (JP) .............................. JP2017-227654

(51) Int. Cl.
*G09G 3/36* (2006.01)

(52) U.S. Cl.
CPC ..... *G09G 3/3688* (2013.01); *G09G 2310/021* (2013.01); *G09G 2320/0252* (2013.01)

(58) Field of Classification Search
None
See application file for complete search history.

(56) References Cited

U.S. PATENT DOCUMENTS

| | | | |
|---|---|---|---|
| 2002/0075219 A1* | 6/2002 | Morita | G09G 3/3688 345/92 |
| 2010/0074032 A1* | 3/2010 | Childs | G11C 11/419 365/189.08 |

(Continued)

FOREIGN PATENT DOCUMENTS

| | | |
|---|---|---|
| JP | 2002-091364 | 3/2002 |
| JP | 2013-066637 | 4/2013 |
| JP | 2014-098863 | 3/2014 |

OTHER PUBLICATIONS

International Search Report and Written Opinion prepared by the Japanese Patent Office dated Jan. 7, 2019, for International Application No. PCT/JP2018/038409.

*Primary Examiner* — Christopher J Kohlman
(74) *Attorney, Agent, or Firm* — Sheridan Ross P.C.

(57) ABSTRACT

A display device according to the present disclosure includes: pixels arranged in a matrix; a data line group that includes a pair of data lines for each pixel column; a data line drive circuit that supplies a positive-phase data signal to one of the pair of data lines, and a negative-phase data signal to the other of the pair of data lines; and an auxiliary drive circuit that is provided for each pair of data lines, and that processes the positive-phase data signal and the negative-phase data signal, in which the auxiliary drive circuit has a dead zone in a region where there is no difference between a positive-phase potential and a negative-phase potential, or where the difference in potential is smaller than a predetermined value. An electronic apparatus according to the present disclosure includes a display device having the configuration described above.

16 Claims, 13 Drawing Sheets

(56) References Cited

U.S. PATENT DOCUMENTS

2012/0050147 A1* 3/2012 Iwasa .................... G09G 3/3614
   345/96
2013/0076706 A1* 3/2013 Andou ................. G09G 3/3648
   345/204
2015/0235604 A1   8/2015 Andou et al.

* cited by examiner

DISPLAY DEVICE AND ELECTRONIC APPARATUS

CROSS REFERENCE TO RELATED APPLICATIONS

This application is a national stage application under 35 U.S.C. 371 and claims the benefit of PCT Application No. PCT/JP2018/038409 having an international filing date of 16 Oct. 2018, which designated the United States, which PCT application claimed the benefit of Japanese Patent Application No. 2017-227654 filed 28 Nov. 2017, the entire disclosures of each of which are incorporated herein by reference.

TECHNICAL FIELD

The present disclosure relates to a display device and an electronic apparatus.

BACKGROUND ART

As a drive system for a display device, there is a digital drive system in which pixels are driven by digitized video signals. In a digital drive type display device, a positive-phase data signal is supplied to one of a pair of data lines provided for each pixel column in a pixel array section including pixels arranged in a matrix, and a negative-phase data signal opposite in phase to the positive-phase data signal is supplied to the other of the pair of data lines. Thus, a video signal is written to the pixels (see, for example, Patent Document 1).

CITATION LIST

Patent Document

Patent Document 1: Japanese Patent Application Laid-Open No. 2013-68837

SUMMARY OF THE INVENTION

Problems to be Solved by the Invention

In the display device described in Patent Document 1, a data line drive circuit is disposed on one end side of data lines of a data line group that includes a pair of data lines provided for each pixel column. The data line drive circuit drives the pairs of data lines to write video signals to pixels. However, in a case where the pairs of data lines are driven by the data line drive circuit disposed on the one end side of the data lines of the data line group, image quality deteriorates partly due to a decrease in the speed of driving a pixel on the other end side of each data line of the data line group. This is because the distance from the data line drive circuit to the pixel increases.

In view of the above, an object of the present disclosure is to provide a display device and an electronic apparatus including the display device capable of improving the image quality of a display image by achieving the driving of pixels at a uniform speed over an entire pixel array section.

Solutions to Problems

A display device according to the present disclosure for achieving the above object includes:

a pixel array section that includes pixels arranged in a matrix;

a data line group that includes a pair of data lines provided for each pixel column;

a data line drive circuit that supplies a positive-phase data signal to one of the pair of data lines, and supplies a negative-phase data signal to the other of the pair of data lines, the negative-phase data signal being opposite in phase to the positive-phase data signal; and an auxiliary drive circuit that is provided for each pair of data lines, and processes the positive-phase data signal and the negative-phase data signal supplied from the data line drive circuit to the pair of data lines, in which the auxiliary drive circuit has a dead zone in a region where there is no difference between a positive-phase potential and a negative-phase potential, or where the difference in potential is smaller than a predetermined value.

Furthermore, an electronic apparatus according to the present disclosure for achieving the above object includes a display device having the configuration described above.

MODE FOR CARRYING OUT THE INVENTION

Figure 1:
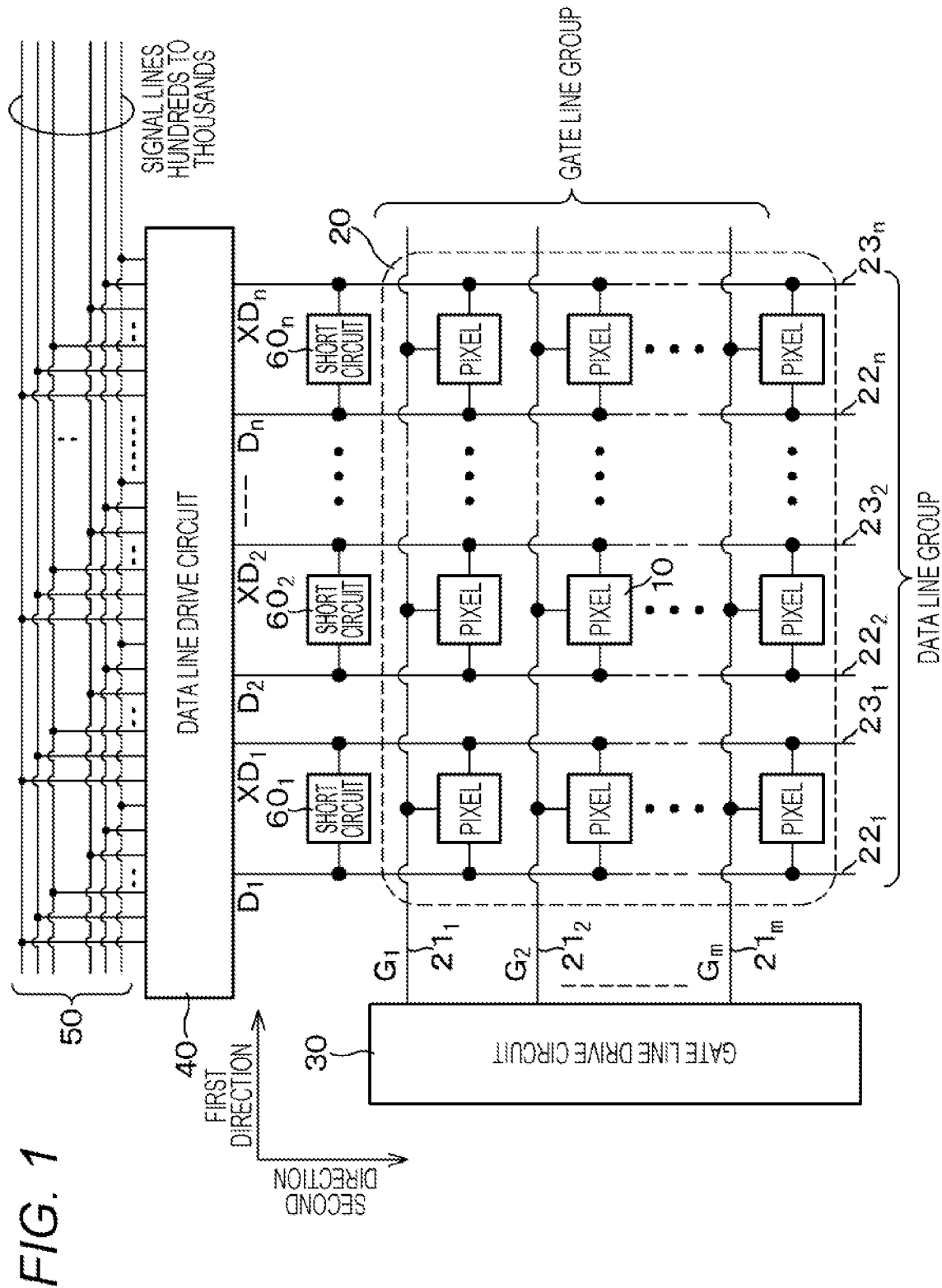
FIG. 1 is a block diagram showing an example of a system configuration of a display device to which the technology of the present disclosure is applied.

A mode for carrying out the technology of the present disclosure (hereinafter, referred to as "embodiment") will be described below in detail with reference to the drawings. The technology of the present disclosure is not limited to the embodiment. In the following description, the same elements or elements having the same functions will be denoted by the same reference signs, without redundant description. Note that description will be provided in the following order.

1. General Description of Display Device and Electronic Apparatus of Present Disclosure
2. Display Device to Which Technology of Present Disclosure Is Applied
   2-1. System Configuration
   2-2. Pixel Configuration
   2-3. Operation of Display Device
   2-3-1. Basic Operation
   2-3-2. Problem
3. Reference Example 1 (Example of Arranging Data Line Drive Circuits on Both Sides of Pixel Array Section)
4. Reference Example 2 (Example of Arranging Latch Circuits on Side Opposite to Data Line Drive Circuit)
5. Display Device According to Embodiment
   5-1. System Configuration
   5-2. Operation of Display Device
   5-3. Example 1
   5-4. Example 2
   5-5. Example 3
6. Variation
7. Electronic Apparatus of Present Disclosure (Example of Projection Display Device)
8. Configurations That Present Disclosure Can Adopt <General Description of Display Device and Electronic Apparatus of Present Disclosure>

A display device and an electronic apparatus according to the present disclosure may be configured such that at least one auxiliary drive circuit is provided for each pair of data lines. Furthermore, the display device and the electronic apparatus according to the present disclosure may be configured such that when a data line drive circuit is disposed on one end side of data lines of a data line group, the auxiliary drive circuit is disposed at least on the other end side of each data line of the data line group. Moreover, the display device and the electronic apparatus according to the present disclosure may also be configured such that the auxiliary drive circuit is disposed at an intermediate part between the one end and the other end of each data line of the data line group. In addition, the display device and the electronic apparatus according to the present disclosure may also be configured such that the auxiliary drive circuit includes a positive-phase side circuit section for a positive-phase data signal and a negative-phase side circuit section for a negative-phase data signal.

Furthermore, the display device and the electronic apparatus according to the present disclosure may be configured such that the positive-phase side circuit section and the negative-phase side circuit section each include a preceding-stage inverter circuit and a subsequent-stage inverter circuit. Here, the display device and the electronic apparatus according to the present disclosure may also be configured such that when VD>VXD, the auxiliary drive circuit detects the following condition in terms of a circuit, and operates to amplify a difference between a potential VD and a potential VXD:

$$VD > VXD + Vth_{\_b1}, \text{ or } VD > VXD + Vth_{\_a2},$$

where VD is a potential of a data line to which the positive-phase data signal is supplied, VXD is a potential of a data line to which the negative-phase data signal is supplied, $Vth_{\_a2}$ is a threshold value for a transistor included in the subsequent-stage inverter circuit of the positive-phase side circuit section, and $Vth_{\_b1}$ is a threshold value for a transistor included in the preceding-stage inverter circuit of the negative-phase side circuit section. Moreover, the display device and the electronic apparatus according to the present disclosure may also be configured such that when VD<VXD, the auxiliary drive circuit detects the following condition in terms of a circuit, and operates to amplify the difference between the potential VD and the potential VXD:

$$VD < VXD - Vth_{\_a1}, \text{ or } VD < VXD - Vth_{\_b2},$$

where $Vth_{\_a1}$ is a threshold value for a transistor included in the preceding-stage inverter circuit of the positive-phase side circuit section, and $Vth_{\_b2}$ is a threshold value for a transistor included in the subsequent-stage inverter circuit of the negative-phase side circuit section.

Alternatively, the display device and the electronic apparatus according to the present disclosure may be configured such that the positive-phase side circuit section and the negative-phase side circuit section each include a preceding-stage inverter circuit to be driven by a first drive signal and a subsequent-stage inverter circuit to be driven by a second drive signal. Here, the display device and the electronic apparatus according to the present disclosure may be configured such that when VD>VXD, the auxiliary drive circuit detects the following condition in terms of a circuit, and operates to amplify a difference between a potential VD and a potential VXD:

$$VD > VGP + Vth_{\_a2}, \text{ or } VXD < VGN - Vth_{\_b1},$$

where VD is a potential of a data line to which the positive-phase data signal is supplied, VXD is a potential of a data line to which the negative-phase data signal is supplied, VGN is the first drive signal, VGP is the second drive signal, $Vth_{\_a2}$ is a threshold value for a transistor included in the preceding-stage inverter circuit of the positive-phase side circuit section, and $Vth_{\_b1}$ is a threshold value for a transistor included in the preceding-stage inverter circuit of the negative-phase side circuit section. Moreover, the display device and the electronic apparatus according to the present disclosure may be configured such that when VD<VXD, the auxiliary drive circuit detects the following condition in terms of a circuit, and operates to amplify the difference between the potential VD and the potential VXD:

$$VXD > VGP + Vth_{\_b2}, \text{ or } VD < VGN - Vth_{\_a1},$$

where $Vth_{\_b2}$ is a threshold value for a transistor included in the preceding-stage inverter circuit of the negative-phase side circuit section, and $Vth_{\_a1}$ is a threshold value for a transistor included in the subsequent-stage inverter circuit of the positive-phase side circuit section.

Alternatively, the display device and the electronic apparatus according to the present disclosure may be configured as follows. The auxiliary drive circuit uses a first power supply voltage and a second power supply voltage having a voltage value equal to or lower than ½ of the first power supply voltage. In addition, the positive-phase side circuit section and the negative-phase side circuit section each include: a NOR circuit that operates at the second power supply voltage, and receives the positive-phase data signal/negative-phase data signal and a predetermined drive signal as inputs; and a level shift circuit that operates at the first power supply voltage, and shifts a high level of output of the NOR circuit from a level of the second power supply voltage to a level of the first power supply voltage. At this time, the auxiliary drive circuit may be configured such that when VD>VXD, the auxiliary drive circuit starts to operate at a time point where a potential VD of the data line falls below a logic threshold of the NOR circuit of the positive-phase side circuit section. Moreover, the auxiliary drive circuit may be configured such that when VD<VXD, the auxiliary drive circuit starts to operate at a time point where a potential VXD of the data line falls below a logic threshold of the NOR circuit of the negative-phase side circuit section.

The display device and the electronic apparatus according to the present disclosure having the above-described preferred configuration may also further include a short circuit that is provided for each pair of data lines and selectively short-circuits the pair of data lines. Then, the display device and the electronic apparatus according to the present disclosure may also be configured such that the short circuit temporarily short-circuits the pair of data lines before the positive-phase data signal and the negative-phase data signal are supplied from the data line drive circuit to the pair of data lines, and releases the short circuit between the pair of data lines after setting a potential between the pair of data lines to an intermediate potential between a positive-phase potential and a negative-phase potential. Furthermore, the display device and the electronic apparatus according to the present disclosure may also be configured such that before the short circuit short-circuits the pair of data lines, the data line drive circuit puts the pair of data lines in a high-impedance state, and supplies at least one of the positive-phase data signal or the negative-phase data signal to the pair of data lines after the short circuit releases the short circuit between the pair of data lines.

Moreover, the display device and the electronic apparatus according to the present disclosure having the above-described preferred configuration may also be configured such that the auxiliary drive circuit operates to hold the positive-phase data signal and the negative-phase data signal in synchronization with the short-circuit operation of the short circuit.

<Display Device to which Technology of Present Disclosure is Applied>

First, a display device to which the technology of the present disclosure is applied will be described. The display device to which the technology of the present disclosure is applied is a digital drive type display device in which pixels are driven by digitized video signals such as digital video signals obtained by pulse width modulation (PWM).

[System Configuration]

FIG. 1 is a block diagram showing an example of a system configuration of the display device to which the technology of the present disclosure is applied. Here, a liquid crystal display device will be described as an example of the display device to which the technology of the present disclosure is applied. The liquid crystal display device has a panel structure (liquid crystal panel) in which two substrates are arranged to face each other, and a space between the two substrates is filled with a liquid crystal material (liquid crystal layer).

As shown in FIG. 1, the present liquid crystal display device has a system configuration including a pixel array section 20, a gate line drive circuit 30, and a data line drive circuit 40. The pixel array section 20 includes pixels 10 arranged in a matrix. The pixel array section 20 with a pixel array of m rows and n columns includes gate lines $21_1$ to $21_m$ (hereinafter, collectively referred to as "gate lines 21" in some cases) provided for respective pixel rows along a row direction which is a first direction. Thus, a gate line group is formed.

Furthermore, for the pixel array of m rows and n columns, pairs of data lines $22_1/23_1$ to $22_n/23_n$ (hereinafter collectively referred to as "pairs of data lines 22/23" in some cases) are provided for respective pixel columns along a column direction which is a second direction. Thus, a data line group is formed. The gate line group and the data line group are electrically insulated.

The gate line drive circuit 30 and the data line drive circuit 40 are arranged around the pixel array section 20. The gate line drive circuit 30 is provided on one end side of the gate lines $21_1$ to $21_m$ of the gate line group, and supplies the gate lines $21_1$ to $21_m$ with gate signals $G_1$ to $G_m$ (hereinafter collectively referred to as "gate signals G" in some cases) as appropriate. The gate signal G is a scanning signal for sequentially driving each pixel 10 of the pixel array section 20 in row units.

The data line drive circuit 40 is provided on one end side of the pairs of data lines $22_1/23_1$ to $22_n/23_n$ of the data line group. Video signals are externally supplied to the data line drive circuit 40 through hundreds to thousands of signal lines 50. The data line drive circuit 40 sequentially supplies an image data signal (grayscale signal) based on a video signal supplied through the signal line 50 to each pixel 10 of the pixel array section 20 in the row direction (first direction). Thus, the data line drive circuit 40 writes the video signal to the pixels 10.

More specifically, the data line drive circuit 40 supplies positive-phase data signals $D_1$ to $D_n$ (hereinafter collectively referred to as "positive-phase data signals D" in some cases) to one (data line 22) of the pair of data lines 22/23. Furthermore, the data line drive circuit 40 supplies the other (data line 23) of the pair of data lines 22/23 with negative-phase data signals $XD_1$ to $XD_n$ (hereinafter, collectively referred to as "negative-phase data signals XD" in some cases) opposite in phase to the positive-phase data signals.

Each pixel 10 of the pixel array section 20 is disposed at a portion where the gate line 21 intersects the pair of data lines 22/23. Then, each pixel 10 is connected to both of the pair of data lines 22/23 such that a video signal is written by differential between the positive-phase data signal D and the negative-phase data signal XD. The present liquid crystal display device is based on, for example, the digital drive system using a digital video signal obtained by pulse width modulation (PWM) such that a video signal is written with digital values of, for example, logic "0" and "1".

The present liquid crystal display device has a system configuration that includes short circuits $60_1$ to $60_n$ (hereinafter collectively referred to as "short circuits 60" in some cases) as peripheral circuits of the pixel array section 20. The short circuit 60 is disposed, for example, between the pixel array section 20 and the data line drive circuit 40. The short circuit 60 is provided for each of the pairs of data lines $22_1/23_1$ to $22_n/23_n$, and selectively short-circuits the pairs of data lines $22_1/23_1$ to $22_n/23_n$.

More specifically, the short circuit 60 temporarily short-circuits the pair of data lines 22/23 before a video signal is written to each pixel 10 of the pixel array section 20, so that a potential between the pair of data lines 22/23 is set to an intermediate potential between a positive-phase potential and a negative-phase potential. Thereafter, the short circuit 60 releases the short circuit between the pair of data lines 22/23, and enables the data line drive circuit 40 to write the video signal to the pixels 10.

Before the pair of data lines 22/23 is short-circuited by the short circuit 60, the data line drive circuit 40 causes the pair of data lines 22/23 to be in a high-impedance state. Then, the data line drive circuit 40 writes the video signal to the pixels 10 after the short circuit between the pair of data lines 22/23 is released by the short circuit 60.

[Pixel Configuration]

Figure 2:
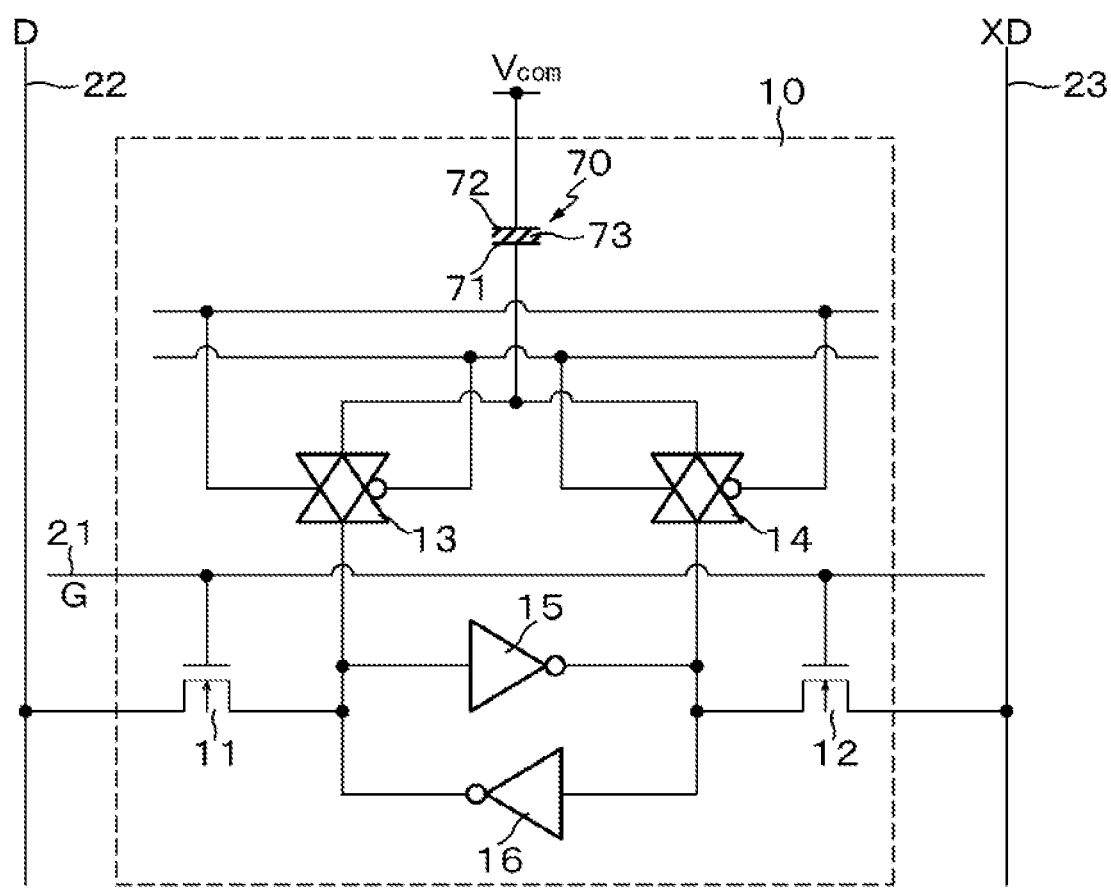
FIG. 2 is a circuit diagram showing a circuit example of a drive circuit for each pixel.

FIG. 2 is a circuit diagram showing a circuit example of a drive circuit of each pixel 10. As shown in FIG. 2, the pixel 10 includes a liquid crystal capacitor 70 including a pixel electrode 71 and a counter electrode 72. A space between the pixel electrode 71 and the counter electrode 72 is filled with a liquid crystal material (liquid crystal layer) 73. The pixel electrodes 71 are provided in a matrix on one of two substrates arranged to face each other and form the liquid crystal panel, specifically, on a pixel substrate (not shown). The pixel substrate can be exemplified by a semiconductor substrate or an insulating substrate. The counter electrode 72 is provided as an electrode common to each pixel 10 of the pixel array section 20, on the other of the two substrates, specifically, on a counter substrate (not shown) arranged to face the pixel substrate that includes a semiconductor substrate or an insulating substrate.

The pixel 10 has a circuit configuration that includes, as circuit elements for driving the liquid crystal capacitor 70, a first transfer gate 11, a second transfer gate 12, a third transfer gate 13, a fourth transfer gate 14, a first inverter circuit 15, and a second inverter circuit 16.

The first transfer gate 11 includes a gate electrode connected to the gate line 21, and also includes source/drain electrodes, one of which is connected to one of the data lines, that is, the data line 22. The second transfer gate 12 includes a gate electrode connected to the gate line 21, and also includes source/drain electrodes, one of which is connected to the other of the data lines, that is, the data line 23.

The first inverter circuit 15 includes an input terminal and an output terminal. The input terminal is connected to the other of the source/drain electrodes of the first transfer gate 11. The output terminal is connected to the other of the source/drain electrodes of the second transfer gate 12. The second inverter circuit 16 includes an input terminal and an output terminal. The input terminal is connected to the other of the source/drain electrodes of the second transfer gate 12. The output terminal is connected to the other of the source/drain electrodes of the first transfer gate 11.

That is, the input terminal of the first inverter circuit 15 and the output terminal of the second inverter circuit 16 are connected in common to the other of the source/drain electrodes of the first transfer gate 11. In addition, the output terminal of the first inverter circuit 15 and the input terminal of the second inverter circuit 16 are connected in common to the other of the source/drain electrodes of the second transfer gate 12.

The third transfer gate 13 and the fourth transfer gate 14 each have a complementary metal oxide semiconductor (CMOS) type circuit configuration. A first terminal of the third transfer gate 13 is connected to a connection node common to the first transfer gate 11, the first inverter circuit 15, and the second inverter circuit 16. A first terminal of the fourth transfer gate 14 is connected to a connection node common to the second transfer gate 12, the first inverter circuit 15, and the second inverter circuit 16.

The pixel electrode 71 of the liquid crystal capacitor 70 is connected to a connection node common to a second terminal of the third transfer gate 13 and a second terminal of the fourth transfer gate 14. Common potential $V_{com}$ is applied to the counter electrode 72.

[Operation of Display Device]

(Basic Operation)

Figure 3:
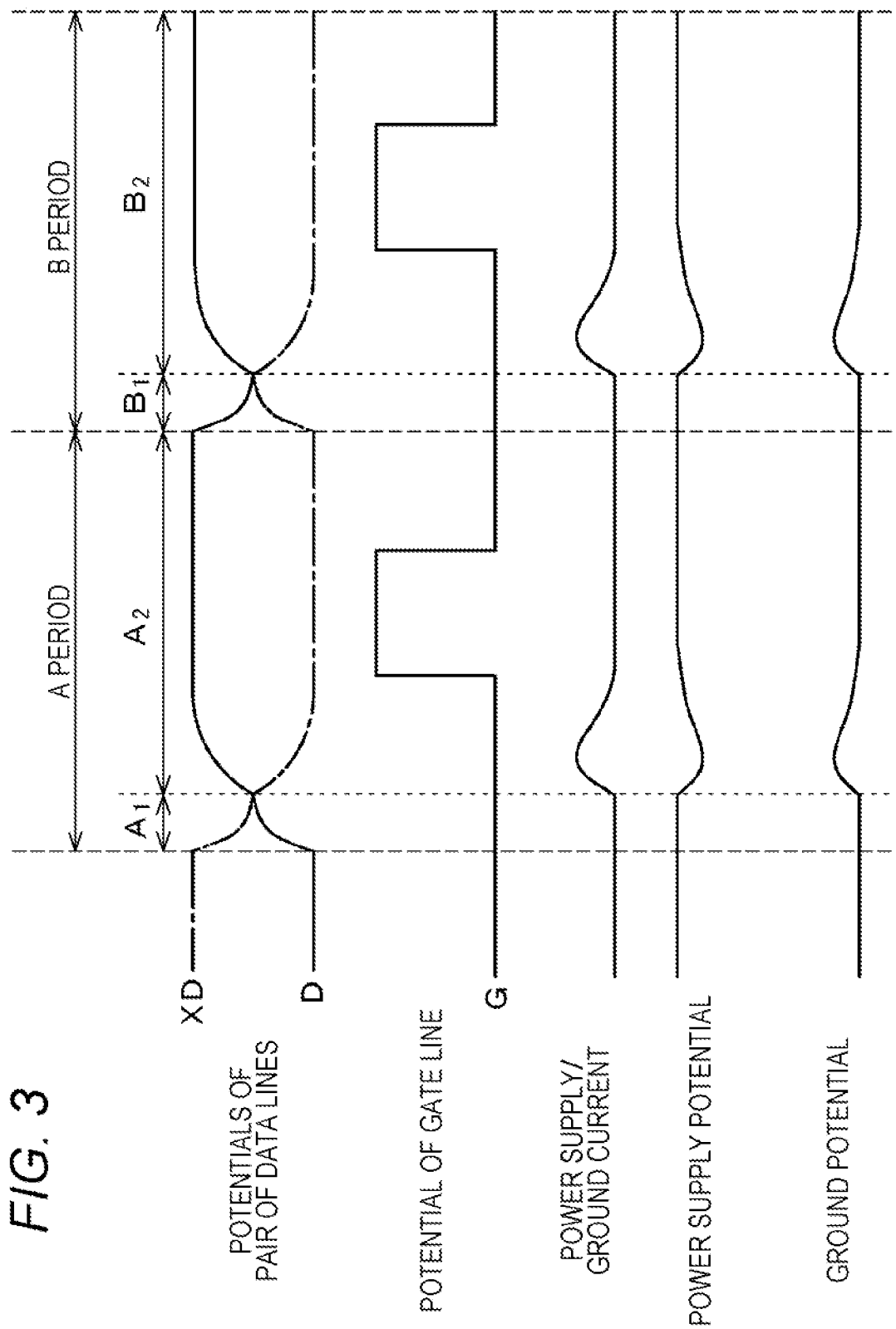
FIG. 3 is a waveform diagram showing the images of waveforms to be generated when writing is performed by the display device to which the technology of the present disclosure is applied.

Next, the operation of the display device having the configuration described above, to which the technology of the present disclosure is applied, will be described with reference to FIG. 3. FIG. 3 is a waveform diagram showing the images of waveforms to be generated when writing is performed by the display device to which the technology of the present disclosure is applied. FIG. 3 shows the images of waveforms of the potentials of the pair of data lines 22/23, the potential of the gate line 21, a power supply/ground potential, a power supply potential, and a ground potential.

The short circuit 60 acts to short-circuit the pair of data lines 22/23 during $A_1$ period in A period and during $B_1$ period in B period. As a result of the pair of data lines 22/23 being short-circuited, the potential between the pair of data lines 22/23 becomes the intermediate potential between the positive-phase potential and the negative-phase potential. Before the pair of data lines 22/23 is short-circuited, the potential of one of the pair of data lines 22/23 is constantly kept at H level (high level) and the potential of the other thereof at L level (low level). Thus, the intermediate potential after the short circuit is equal to $\{(\frac{1}{2}) \times (H\ level + L\ level)\}$.

Before the pair of data lines 22/23 is short-circuited by the short circuit 60, an output terminal of the data line drive circuit 40, to which the pair of data lines 22/23 is connected, is put in a high-impedance state. This can prevent the output terminal of the data line drive circuit 40 from being short-circuited when the pair of data lines 22/23 is short-circuited.

The short circuit between the pair of data lines 22/23 is released by the short circuit 60 in $A_2$ period and $B_2$ period after the potentials of the pair of data lines 22/23 become equal to the intermediate potential. After the short-circuit therebetween is released, the data signals D/DX are supplied from the data line drive circuit 40 to the pair of data lines 22/23 to complete the charging/discharging of the pair of data lines 22/23. Then, the gate signal G is set to H level, and the data signals D/DX are written to the pixels 10.

According to a series of operations described above, the potentials of the pair of data lines 22/23 simply change due to the data signals D/DX written to the pair of data lines 22/23, in such a way as to differ in direction between the A period and the B period on the basis of changes in directions of the data signal D and the data signal DX. Therefore, the potential of one of the pair of data lines 22/23 always changes from the same intermediate potential to a power supply level (power supply voltage $V_{cc}$) and the potential of the other thereof to a ground level (ground potential).

As a result, there is no difference in power supply/ground current serving to charge/discharge the pair of data lines 22/23 between the A period and the B period. Similarly, there is no difference in changes of power supply/ground potentials between the A period and the B period. Accordingly, it is possible to reduce a deterioration in image quality due to changes in the power supply potential and the ground potential caused by charge/discharge currents of the data line group at the time of writing the video signal.

Note that in the example of the display device with the configuration described above, both of the pair of data lines 22/23 are connected to the single pixel 10 to apply the positive-phase data signal D and the negative-phase data signal DX to the single pixel 10, so that a video signal is written by differential therebetween. However, the configuration of the display device is not limited thereto. That is, only one of the pair of data lines 22/23 may be connected to the single pixel 10 to apply only one of the positive-phase data signal D or the negative-phase data signal DX to the single pixel 10, so that a video signal is written. In this case, the positive-phase data signal D and the negative-phase data signal DX are alternately written as video signals for each pixel in the second direction (column direction).

Furthermore, in the example of the display device with the configuration described above, the short circuits 60 ($60_1$ to $60_n$) are arranged on the data line drive circuit 40 side. However, the short circuits 60 may be arranged on a side opposite to the data line drive circuit 40 side. Alternatively, the short circuits 60 may be arranged on both sides of the pixel array section 20.

(Problem)

The above-described display device to which the technology of the present disclosure is applied has adopted a configuration in which the data line drive circuit 40 is disposed on one end side of the data lines 22/23 of the data line group such that the data line drive circuit 40 drives the pair of data lines 22/23 to write video signals to the pixels 10. In the case of this configuration, the distance from the data line drive circuit 40 to the pixel 10 on the other end side of each data line 22/23 of the data line group increases. As a result, the speed of driving the pixels 10 located far from the data line drive circuit 40 decreases. This may contribute to a deterioration in image quality.

Reference Example 1

Figure 4:
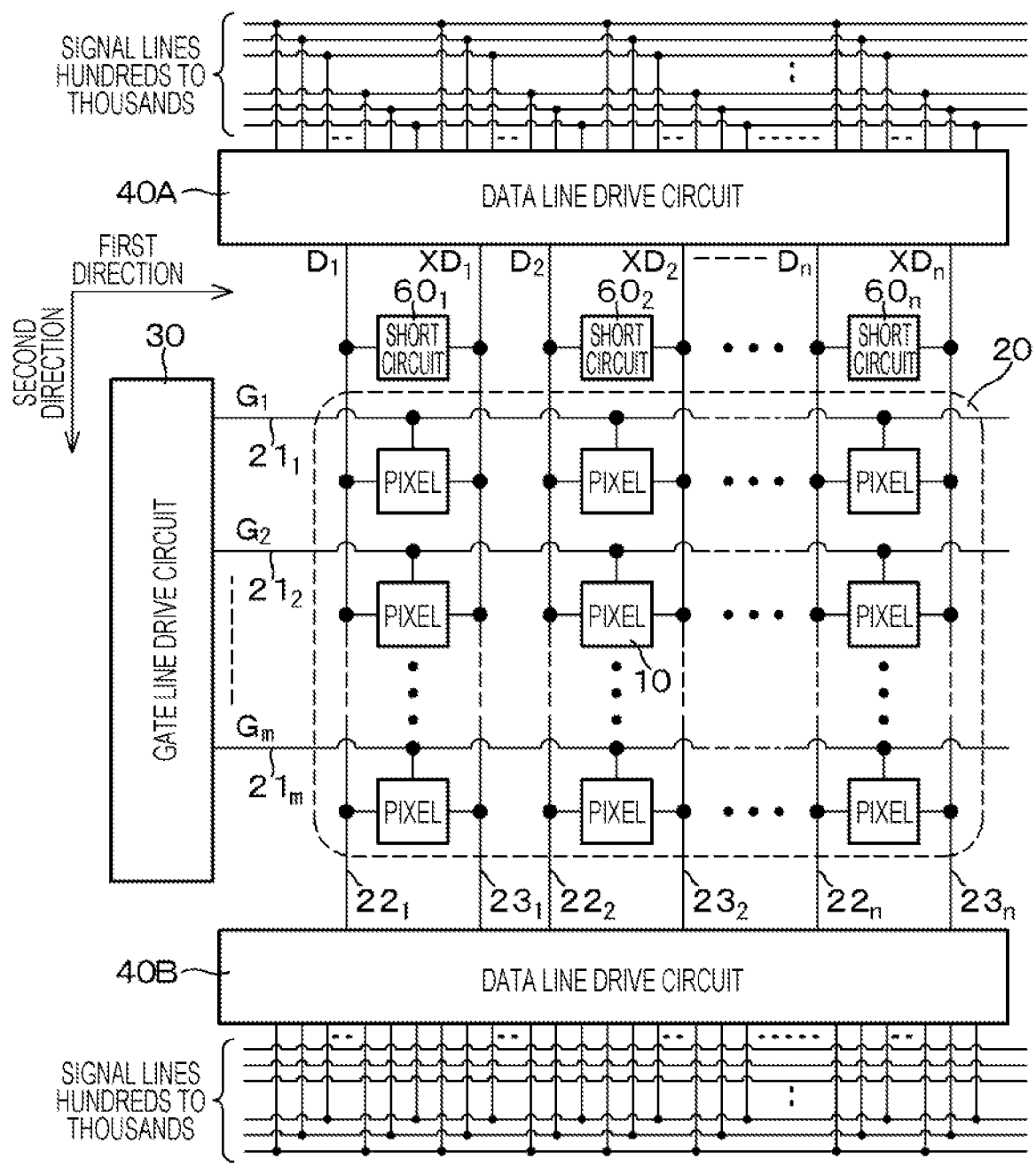
FIG. 4 is a block diagram showing a system configuration of a display device according to Reference Example 1.

It is conceivable that a configuration is adopted in which the data line drive circuits 40 are arranged on both sides of the pixel array section 20 so as to eliminate a delay in driving the pixels 10 located far from the data line drive circuit 40. A display device having this configuration will be described below as Reference Example 1. FIG. 4 shows a system configuration of the display device according to Reference Example 1.

As shown in FIG. 4, the display device according to Reference Example 1 includes a data line drive circuit 40A and a data line drive circuit 40B. The data line drive circuit 40A is disposed on one end side of data lines of a data line group that includes a pair of data lines 22/23 provided for each pixel column. The data line drive circuit 40B is disposed on the other end side of the data lines of the data line group. That is, the data line drive circuit 40A and the data line drive circuit 40B are arranged on both sides of a pixel array section 20 in a second direction (column direction).

According to the display device according to Reference Example 1, each pair of data lines 22/23 of the data line group can be driven from both end sides. Thus, compared with the display device of FIG. 1 in which data lines are driven from one side, it is possible to achieve the driving of pixels 10 at a uniform speed over the entire pixel array section 20. The display device according to Reference Example 1 is advantageous in this respect. Meanwhile, there are hundreds to thousands of signal lines 50. As a result of arranging the data line drive circuit 40A and the data line drive circuit 40B on both sides of the pixel array section 20, the number of the signal lines 50 is doubled. This significantly increases power consumption. The display device according to Reference Example 1 is disadvantageous in this respect.

Reference Example 2

Figure 5:
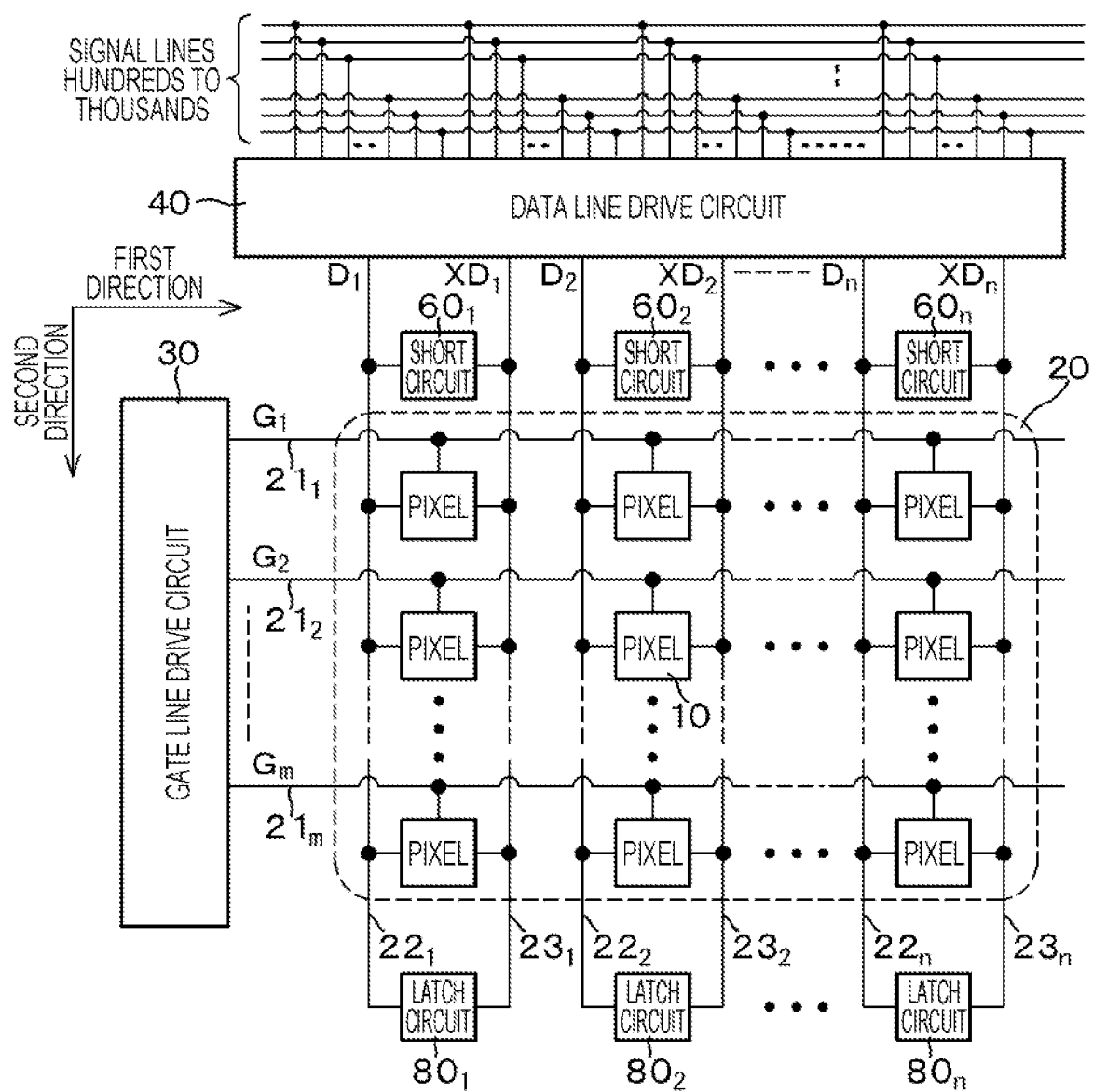
FIG. 5 is a block diagram showing a system configuration of a display device according to Reference Example 2.

It is conceivable that a configuration is adopted in which a latch circuit is disposed on a side opposite to the side on which the data line drive circuit 40 is disposed with the pixel array section 20 interposed therebetween, so as to eliminate a delay in driving the pixels 10 located far from the data line drive circuit 40 without increasing the number of the signal lines 50. A display device having this configuration will be described below as Reference Example 2. FIG. 5 shows a system configuration of the display device according to Reference Example 2.

As shown in FIG. 5, the display device according to Reference Example 2 includes latch circuits $80_1$ to $80_n$ (hereinafter, collectively referred to as "latch circuits 80" in some cases) arranged for respective pixel columns, that is, for respective pairs of data lines 22/23, on a side opposite to a side on which a data line drive circuit 40 is disposed with a pixel array section 20 interposed between the latch circuits $80_1$ to $80_n$ and the data line drive circuit 40. The latch circuit 80 latches (holds) a positive-phase data signal D and a negative-phase data signal XD supplied from the data line drive circuit 40 to the pair of data lines 22/23.

According to the display device of Reference Example 2, the data signals D/XD supplied from the data line drive circuit 40 to the pair of data lines 22/23 are latched by the latch circuit 80. As a result, it is possible to achieve operation and effect similar to those in the case of driving each pair of data lines 22/23 from both end sides as in the case of Reference Example 1. Accordingly, it is possible to achieve the driving of pixels 10 at a uniform speed over the entire pixel array section 20 without increasing the number of signal lines 50.

However, assuming that H level of the pair of data lines 22/23 is set to power supply voltage $V_{cc}$ and L level is set to a ground potential in the case of the display device according to Reference Example 2, the potentials of the pair of data lines 22/23 become close to $V_{cc}/2$ when the pair of data lines 22/23 is short-circuited by a short circuit 60. As a result, a through current flows through the latch circuit 80 to increase current consumption. Furthermore, a malfunction or the like is highly likely to occur depending on the operation timing of the latch circuit 80. The display device according to Reference Example 2 is considered to be disadvantageous in this respect.

Display Device According to Embodiment

Figure 6:
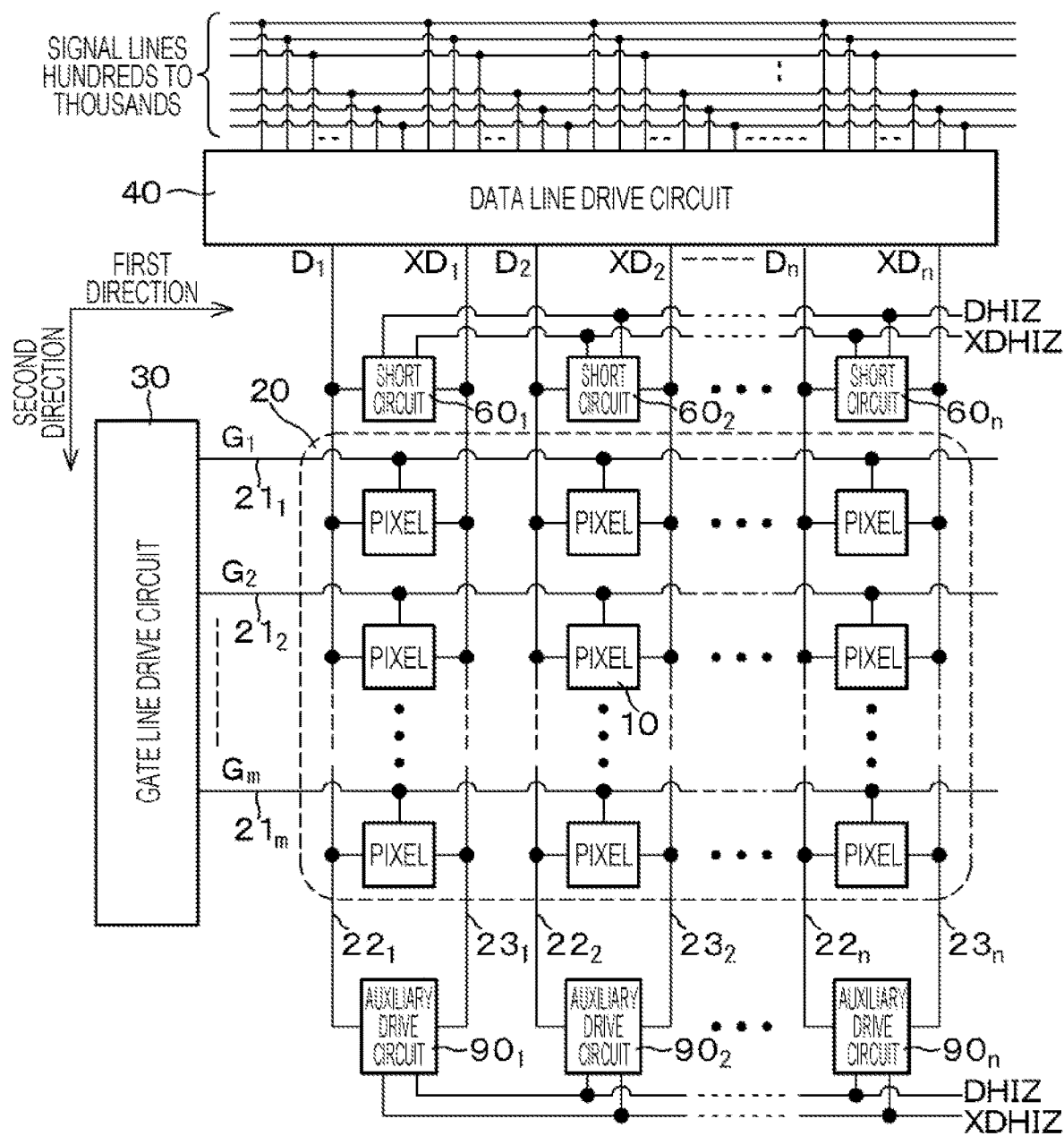
FIG. 6 is a block diagram showing an example of a system configuration of a display device according to an embodiment of the present disclosure.

FIG. 6 is a block diagram showing an example of a system configuration of a display device according to an embodiment of the present disclosure. The display device according to the present embodiment is also a digital drive type display device in which pixels are driven by digitized video signals such as digital video signals obtained by pulse width modulation (PWM). Here, a liquid crystal display device will also be described as an example of the display device according to the present embodiment.

[System Configuration]

As shown in FIG. 6, the display device according to the present embodiment includes auxiliary drive circuits $90_1$ to $90_n$ (hereinafter, collectively referred to as "auxiliary drive circuits 90" in some cases) arranged for respective pixel columns of a pixel array section 20, that is, for respective pairs of data lines 22/23. The auxiliary drive circuit 90 processes a positive-phase data signal D and a negative-phase data signal XD supplied from a data line drive circuit 40 to the pair of data lines 22/23. Specifically, the auxiliary drive circuit 90 operates to amplify a difference in potential between the pair of data lines 22/23.

More specifically, while the data line drive circuit 40 is disposed on one end side of the data lines 22/23 of a data line group, the auxiliary drive circuit 90 Is disposed on the other end side of each data line 22/23, that is, on a side opposite to the side on which the data line drive circuit 40 Is disposed with the pixel array section 20 interposed therebetween.

Furthermore, the auxiliary drive circuit 90 has a dead zone in a region where there is no difference between a positive-phase potential (for example, power supply voltage $V_{cc}$) and a negative-phase potential (for example, a ground potential/ ground level), or where the difference in potential is smaller than a predetermined value. For example, the region is in the vicinity of intermediate potential $V_{cc}/2$. Here, the vicinity of the intermediate potential $V_{cc}/2$ for the dead zone refers to a predetermined voltage range centered on the intermediate potential $V_{cc}/2$. The auxiliary drive circuit 90 has the dead zone in the vicinity of the intermediate potential $V_{cc}/2$. Thus, the auxiliary drive circuit 90 performs no circuit operation in a situation where there is no potential difference between the pair of data lines 22/23 or the potential difference is smaller than a predetermined value.

In synchronization with the short-circuit operation of a short circuit 60, the auxiliary drive circuit 90 operates to amplify a difference in potential between the pair of data lines 22/23 when the positive-phase data signal D and the negative-phase data signal XD are supplied from the data line drive circuit 40 to the pair of data lines 22/23. More specifically, when the short circuit 60 operates to short-circuit the pair of data lines 22/23 while being driven by drive signals DHIZ and XDHIZ, the auxiliary drive circuit 90 also operates to amplify the difference in potential between the pair of data lines 22/23 while being driven by the drive signals DHIZ and XDHIZ. Here, the drive signal XDHIZ is an inverted signal of the drive signal DHIZ.

In the present example, a configuration has been illustrated in which the data line drive circuit 40 is disposed on the one end side of the data lines 22/23 and the auxiliary drive circuits $90_1$ to $90_n$ are disposed on the other end side of the data lines 22/23. However, the arrangement may be reversed. That is, the auxiliary drive circuits $90_1$ to $90_n$ may be disposed on the one end side of the data lines 22/23, and the data line drive circuit 40 may be disposed on the other end side of the data lines 22/23.

[Operation of Display Device]

Before a video signal is written, more specifically, before the pair of data lines 22/23 is short-circuited by the short circuit 60, the data line drive circuit 40 causes an output terminal, to which the pair of data lines 22/23 is connected, to be in a high-impedance state so as to prevent the output terminal from being short-circuited by the short circuit 60. Thereafter, the short circuit 60 short-circuits the pair of data lines 22/23 while being driven by the drive signals DHIZ and XDHIZ.

As a result of the pair of data lines 22/23 being short-circuited, a potential between the pair of data lines 22/23 becomes an intermediate potential between the positive-phase potential and the negative-phase potential, that is, $\{(½)\times(H\ level+L\ level)\}$. Assuming that the positive-phase potential is equal to the power supply voltage $V_{cc}$ and the negative-phase potential is equal to the ground potential/ground level, the intermediate potential between the positive-phase potential and the negative-phase potential is equal to $V_{cc}/2$. After the potentials of the pair of data lines 22/23 become the intermediate potential, the short circuit 60 releases the short circuit between the pair of data lines 22/23 while being driven by the drive signals DHIZ and XDHIZ.

After the short circuit between the pair of data lines 22/23 is released, the data line drive circuit 40 supplies the data signals D/DX to the pair of data lines 22/23 to complete the charging/discharging of the pair of data lines 22/23. Thus, the data signals D/DX are written to pixels 10. With this series of operations, it is possible to reduce a deterioration in image quality due to changes in the power supply potential and the ground potential caused by charge/discharge currents of the data line group at the time of writing the video signal.

Furthermore, when the positive-phase data signal D and the negative-phase data signal XD are supplied from the data line drive circuit 40 to the pair of data lines 22/23, the auxiliary drive circuit 90 operates to amplify the difference in potential between the pair of data lines 22/23 while being driven by the drive signals DHIZ and XDHIZ. As a result, it is possible to achieve operation and effect similar to those in the case of driving each pair of data lines 22/23 of the data line group from both end sides thereof. Then, it is possible to achieve the driving of the pixels 10 at a more uniform speed over the entire pixel array section 20 by driving each pair of data lines 22/23 of the data line group from both end sides thereof, than in the case of driving each pair of data lines 22/23 from one side. Therefore, the image quality of a display image can be improved.

Moreover, the auxiliary drive circuit 90 has the dead zone in the region where there is no difference between the positive-phase potential and the negative-phase potential, or where the difference in potential is smaller than the predetermined value. As a result, the auxiliary drive circuit 90 performs no circuit operation in a situation where there is no potential difference between the pair of data lines 22/23 or the potential difference is small. Therefore, even if the potentials of the pair of data lines 22/23 become close to $V_{cc}/2$ when the pair of data lines 22/23 is short-circuited by the short circuit 60, no idling current/through current flows through the auxiliary drive circuit 90, or no malfunction of the auxiliary drive circuit 90 occurs depending on operation timing. Therefore, it is possible to achieve the driving of the pixels 10 at a uniform speed over the entire pixel array section 20 while eliminating the need of timing adjustment to prevent malfunction and preventing generation of idling current/through current.

Furthermore, as compared with the case where the data line drive circuits 40A and 40B are arranged on both sides of the pixel array section 20 as in the case of Reference Example 1, it is possible to significantly reduce current consumption while preventing a decrease in the speed of driving the pixels 10.

Described below are specific examples of the auxiliary drive circuit 90 which has a dead zone in a region where there is no difference between a positive-phase potential and a negative-phase potential, or where the difference in potential is smaller than a predetermined value.

Example 1

Figure 7:
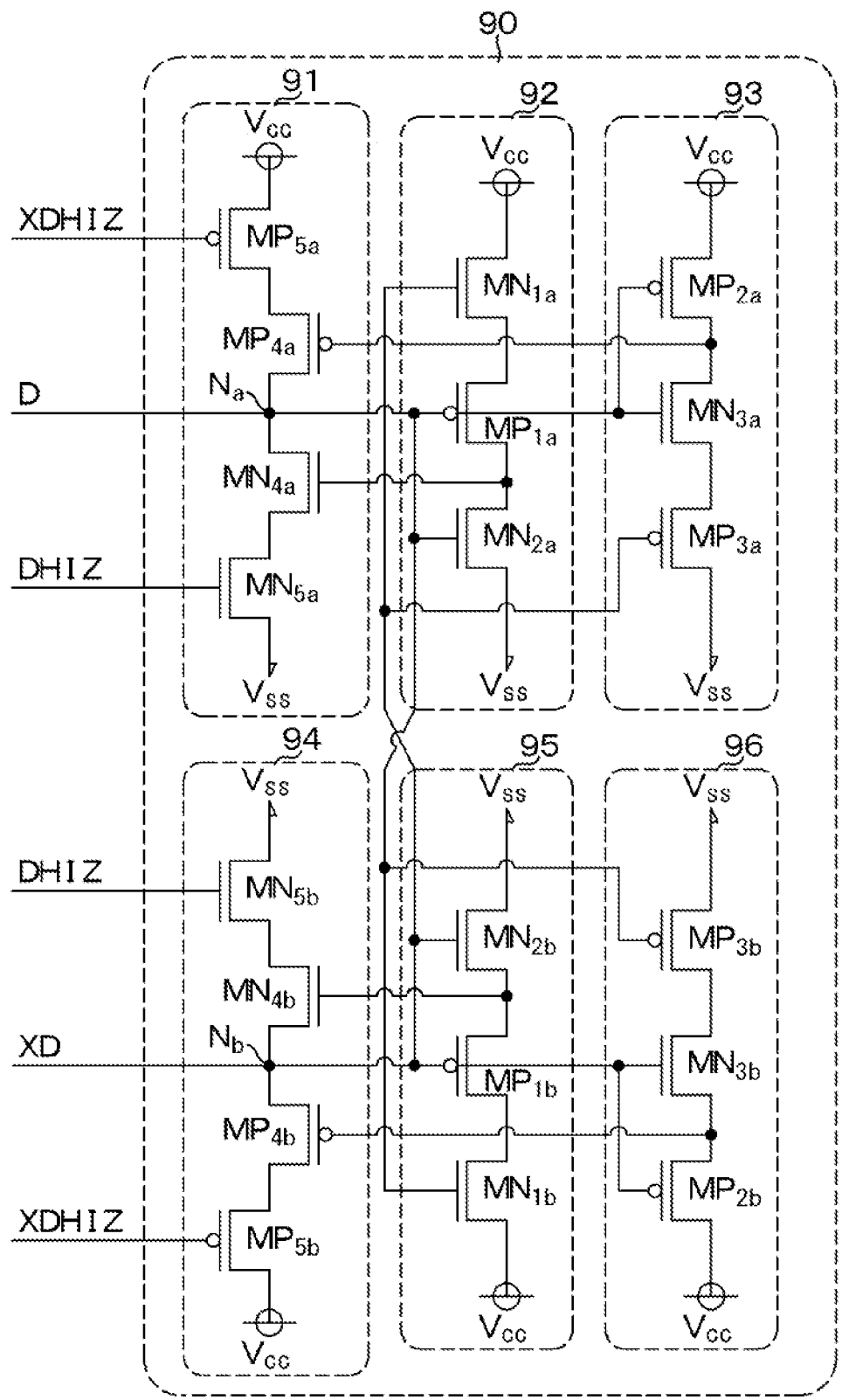
FIG. 7 is a circuit diagram showing a circuit example of an auxiliary drive circuit according to Example 1.

Example 1 is an example in which an auxiliary drive circuit 90 has a dead zone in the vicinity of intermediate potential $V_{cc}/2$ between a positive-phase potential and a negative-phase potential. FIG. 7 shows a circuit example of the auxiliary drive circuit 90 according to Example 1. The auxiliary drive circuit 90 according to Example 1 includes a positive-phase side circuit section 97 (upper part in the drawing) for positive-phase data signals D ($D_1$ to $D_n$) and a negative-phase side circuit section 98 (lower part in the drawing) for negative-phase data signals XD ($XD_1$ to $XD_n$). The positive-phase side circuit section 97 includes an input circuit 91, a preceding-stage inverter circuit 92, and a subsequent-stage inverter circuit 93. The negative-phase side circuit section 98 includes an input circuit 94, a preceding-stage inverter circuit 95, and a subsequent-stage inverter circuit 96.

In the positive-phase side circuit section 97, the input circuit 91 includes a P-channel transistor $MP_{5a}$, a P-channel transistor $MP_{4a}$, an N-channel transistor $MN_{4a}$, and an N-channel transistor $MN_{5a}$ connected in series between a node of power supply voltage $V_{cc}$ on a high potential side and a node of power supply voltage $V_{ss}$ on a low potential side. A drive signal XDHIZ (an inverted signal of a drive signal DHIZ) is applied to the gate electrode of the P-channel transistor $MP_{5a}$. The drive signal DHIZ is applied to the gate electrode of the N-channel transistor $MN_{5a}$. Furthermore, the positive-phase data signal D supplied from a data line drive circuit 40 to one of data lines, that is, a data line 22 is applied to a node $N_a$ to which the P-channel transistor $MP_{4a}$ and the N-channel transistor $MN_{4a}$ are connected in common.

The preceding-stage inverter circuit 92 includes an N-channel transistor $MN_{1a}$, a P-channel transistor $MP_{1a}$, and an N-channel transistor $MN_{2a}$ connected in series between the node of the power supply voltage $V_{cc}$ and the node of the power supply voltage $V_{ss}$. The respective gate electrodes of the P-channel transistor $MP_{1a}$ and the N-channel transistor $MN_{2a}$ are connected in common to form a CMOS inverter. Then, an input terminal (each gate electrode) of the CMOS inverter is connected to the node $N_a$ to which the positive-phase data signal D is applied. In addition, an output terminal (connection node common to the transistors $MP_{1a}$ and $MN_{2a}$) is connected to the gate electrode of the N-channel transistor $MN_{4a}$.

The subsequent-stage inverter circuit 93 includes a P-channel transistor $MP_{2a}$, an N-channel transistor $MN_{3a}$, and a P-channel transistor $MP_{3a}$ connected in series between the node of the power supply voltage $V_{cc}$ and the node of the power supply voltage $V_{ss}$. The respective gate electrodes of the P-channel transistor $MP_{2a}$ and the N-channel transistor $MN_{3a}$ are connected in common to form a CMOS inverter. Then, an input terminal (each gate electrode) of the CMOS inverter is connected to the node $N_a$ to which the positive-phase data signal D is applied. In addition, an output terminal (connection node common to the transistors $MP_{2a}$ and $MN_{3a}$) is connected to the gate electrode of the P-channel transistor $MP_{4a}$.

In the negative-phase side circuit section 98, the input circuit 94 includes a P-channel transistor $MP_{5b}$, a P-channel transistor $MP_{4b}$, an N-channel transistor $MN_{4b}$, and an N-channel transistor $MN_{5b}$ connected in series between the node of the power supply voltage $V_{cc}$ and the node of the power supply voltage $V_{ss}$. The drive signal XDHIZ is applied to the gate electrode of the P-channel transistor $MP_{5b}$. The drive signal DHIZ is applied to the gate electrode of the N-channel transistor $MN_{5b}$. Furthermore, the negative-phase data signal XD supplied from the data line drive circuit 40 to the other data line, that is, a data line 23 is applied to a node $N_b$ to which the P-channel transistor $MP_{4b}$ and the N-channel transistor $MN_{4b}$ are connected in common.

The preceding-stage inverter circuit 95 includes an N-channel transistor $MN_{1b}$, a P-channel transistor $MP_{1b}$, and an N-channel transistor $MN_{2b}$ connected in series between the node of the power supply voltage $V_{cc}$ and the node of the power supply voltage $V_{ss}$. The respective gate electrodes of the P-channel transistor $MP_{1b}$ and the N-channel transistor $MN_{2b}$ are connected in common to form a CMOS inverter. Then, an input terminal (each gate electrode) of the CMOS inverter is connected to the node $N_b$ to which the negative-phase data signal XD is applied. In addition, an output terminal (connection node common to the transistors $MP_{1b}$ and $MN_{2b}$) is connected to the gate electrode of the N-channel transistor $MN_{4b}$.

The subsequent-stage inverter circuit 96 includes a P-channel transistor $MP_{2b}$, an N-channel transistor $MN_{3b}$, and a P-channel transistor $MP_{3b}$ connected in series between the node of the power supply voltage $V_{cc}$ and the node of the power supply voltage $V_{ss}$. The respective gate electrodes of the P-channel transistor $MP_{2b}$ and the N-channel transistor $MN_{3b}$ are connected in common to form a CMOS inverter. Then, an input terminal (each gate electrode) of the CMOS inverter is connected to the node $N_b$ to which the negative-phase data signal XD is applied. In addition, an output terminal (connection node common to the transistors $MP_{2b}$ and $MN_{3b}$) is connected to the gate electrode of the P-channel transistor $MP_{4b}$.

The gate electrode of the transistor $MN_{1a}$ of the inverter circuit 92 and the gate electrode of the transistor $MP_{3a}$ of the inverter circuit 93 of the positive-phase side circuit section 97 are connected to the node $N_b$ (that is, the respective gate electrodes of the transistor $MP_{1b}$ and the transistor $MN_{2b}$) to which the negative-phase data signal XD is applied. Furthermore, the gate electrode of the transistor $MN_{1b}$ of the inverter circuit 95 and the gate electrode of the transistor $MP_{3b}$ of the inverter circuit 96 of the negative-phase side circuit section 98 are connected to the node $N_a$ (that is, the respective gate electrodes of the transistors $MP_{1a}$ and the transistor $MN_{2a}$) to which the positive-phase data signal D is applied.

The circuit operation of the auxiliary drive circuit 90 according to Example 1 with the configuration described above will be described with reference to a waveform diagram of FIG. 8. The waveform diagram of FIG. 8 shows waveforms of the potentials of a pair of the data lines 22/23, the potential of a gate line 21, and the drive signal DHIZ.

Figure 8:
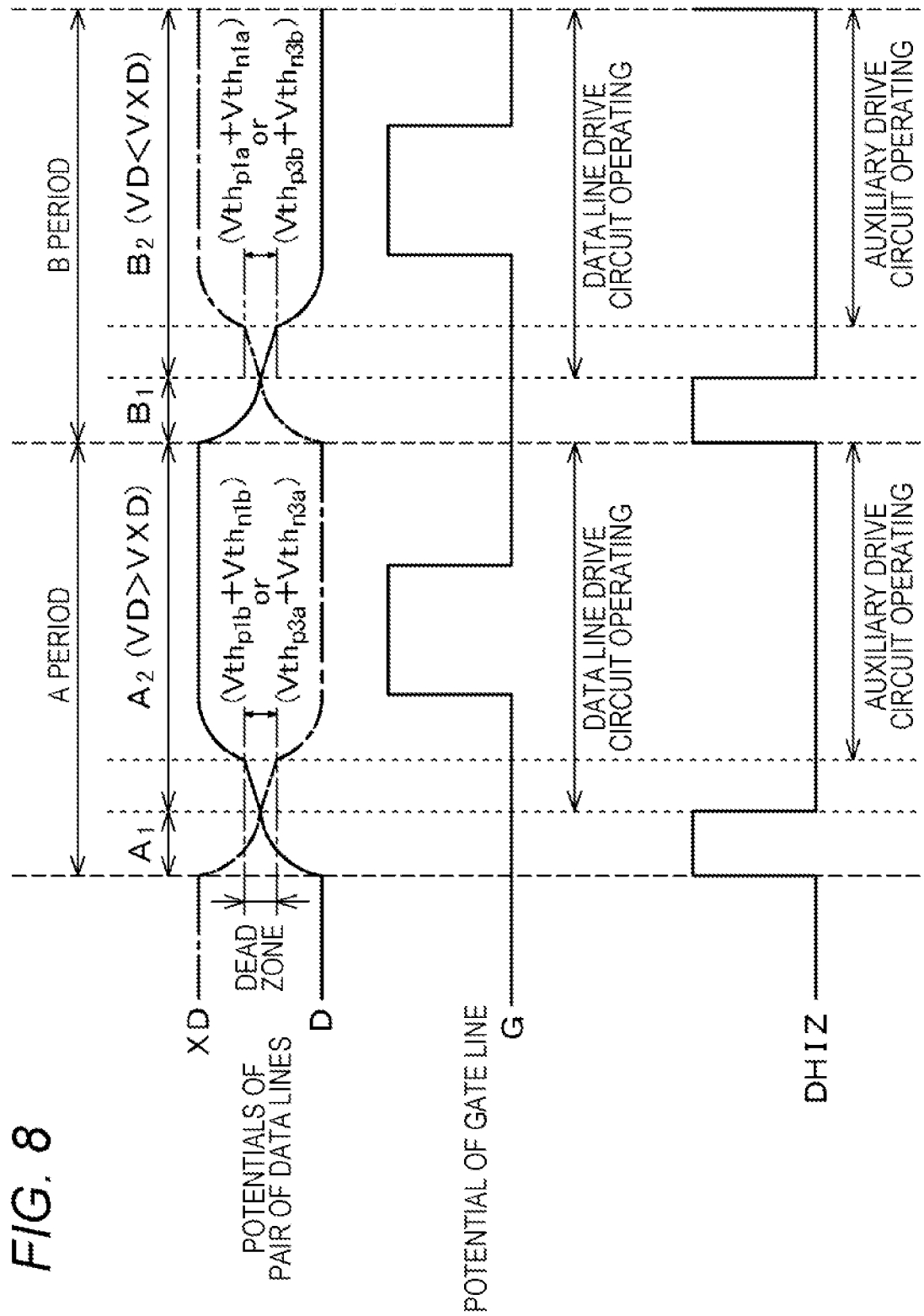
FIG. 8 is a waveform diagram for illustrating circuit operation of the auxiliary drive circuit according to Example 1.

As shown in FIG. 8, the drive signal DHIZ is at H level in period A1 and period B1. In response to the drive signal DHIZ, a short circuit 60 operates to short-circuit the pair of data lines 22/23. As a result of the pair of data lines 22/23 being short-circuited, the potentials of these data lines 22/23 become an intermediate potential between a positive-phase potential (H level) and a negative-phase potential (L level), that is, $\{(\frac{1}{2}) \times (\text{H level} + \text{L level})\}$.

At this time, in the auxiliary drive circuit 90, the P-channel transistor $MP_{5a}$ and the N-channel transistor $MN_{5a}$ of the input circuit 91 of the positive-phase side circuit section 97 are off. In addition, the P-channel transistor $MP_{5b}$ and the N-channel transistor $MN_{5b}$ of the input circuit 94 of the negative-phase side circuit section 98 are off.

Next, the drive signal DHIZ is at L level in period A2 and period B2. In the period A2 and the period B2, the pair of data lines 22/23 is driven by the data line drive circuit 40. At this time, in the auxiliary drive circuit 90, the transistors $MP_{5a}$ and $MN_{5a}$ of the positive-phase side circuit section 97 and the transistors $MP_{5b}$ and $MN_{5b}$ of the negative-phase side circuit section 98 are off. Thus, even if the pair of data lines 22/23 is driven by the data line drive circuit 40, the auxiliary drive circuit 90 does not operate.

That is, the auxiliary drive circuit 90 has a dead zone in a region where there is no difference between the positive-phase potential and the negative-phase potential, or where the difference in potential is smaller than a predetermined value. Specifically, the auxiliary drive circuit 90 has the dead zone in the vicinity of the intermediate potential $V_{cc}/2$. Thus, the auxiliary drive circuit 90 does not operate. As a result, unlike the latch circuit 80 in the display device according to Reference Example 2, no idling current/through current flows to consume current or cause malfunction when the pair of data lines 22/23 is short-circuited.

The auxiliary drive circuit 90 starts to operate under the following conditions. When VD denotes the potential of the data line 22 to which the positive-phase data signal D is supplied and VXD denotes the potential of the data line 23 to which the negative-phase data signal XD is supplied, the relationship between the potential VD of the data line 22 and the potential VXD of the data line 23 is as follows. Then, the auxiliary drive circuit 90 detects in terms of a circuit that the potential VD and the potential VXD satisfy the following conditions, and operates to amplify a difference between the potential VD of the data line 22 and the potential VXD of the data line 23.

At this time, the auxiliary drive circuit 90 does not need to control operation timing or secure an unnecessary operation margin so as to detect the potential difference in terms of a circuit. Furthermore, it is possible to operate with the single power supply voltage $V_{cc}$.

When VD>VXD:

$$VD > VXD + Vth_{\_b1}, \text{ or } VD > VXD + Vth_{\_a2}.$$

Here, the following hold:

$$Vth_{\_b1} = Vth_{p1b} + Vth_{n1b},$$

$$Vth_{\_a2} = Vth_{p3a} + Vth_{n3a},$$

where $Vth_{p3a}$ and $Vth_{n3a}$ are respective threshold voltages of the transistors $MP_{3a}$ and $MN_{3a}$ in the inverter circuit 93 of the positive-phase side circuit section 97, and $Vth_{p1b}$ and $Vth_{n1b}$ are respective threshold voltages of the transistors $MP_{1b}$ and $MN_{1b}$ in the inverter circuit 95 of the negative-phase side circuit section 98.

That is, when VD>VXD, the transistor $MP_{1b}$ of the inverter circuit 95 of the negative-phase side circuit section 98 and the transistor $MP_{3a}$ of the inverter circuit 93 of the positive-phase side circuit section 97 are turned on in a case where gate voltages thereof are lower than source voltages thereof by the threshold voltages $Vth_{p1b}$ and $Vth_{p3a}$, respectively. Furthermore, the transistor $MN_{1b}$ of the inverter circuit 95 of the negative-phase side circuit section 98 and the transistor $MN_{3a}$ of the inverter circuit 93 of the positive-phase side circuit section 97 are turned on in a case where gate voltages thereof are higher than source voltages thereof by the threshold voltages $Vth_{n1b}$ and $Vth_{n3a}$, respectively.

When VD<VXD:

$$VD < VXD - Vth_{\_a1}, \text{ or } VD < VXD - Vth_{\_b2}.$$

Here, the following hold:

$$Vth_{\_a1} = Vth_{p1a} + Vth_{n1a},$$

$$Vth_{\_b2} = Vth_{p3b} + Vth_{n3b},$$

where $Vth_{p1a}$ and $Vth_{n1a}$ are respective threshold voltages of the transistors $MP_{1a}$ and $MN_{1a}$ in the inverter circuit 92 of the positive-phase side circuit section 97, and $Vth_{p3b}$ and $Vth_{n3b}$ are respective threshold voltages of the transistors $MP_{3b}$ and $MN_{3b}$ in the inverter circuit 96 of the negative-phase side circuit section 98.

That is, when VD<VXD, the transistor $MP_{1a}$ of the inverter circuit 92 of the positive-phase side circuit section 97 and the transistor $MP_{3b}$ of the inverter circuit 96 of the negative-phase side circuit section 98 are turned on in a case where gate voltages thereof are lower than source voltages thereof by the threshold voltages $Vth_{p1a}$ and $Vth_{p3b}$, respectively. Furthermore, the transistor $MN_{1a}$ of the inverter circuit 92 of the positive-phase side circuit section 97 and the transistor $MN_{3b}$ of the inverter circuit 96 of the negative-phase side circuit section 98 are turned on in a case where gate voltages thereof are higher than source voltages thereof by the threshold voltages $Vth_{n1a}$ and $Vth_{n3b}$, respectively.

Example 2

Figure 9:
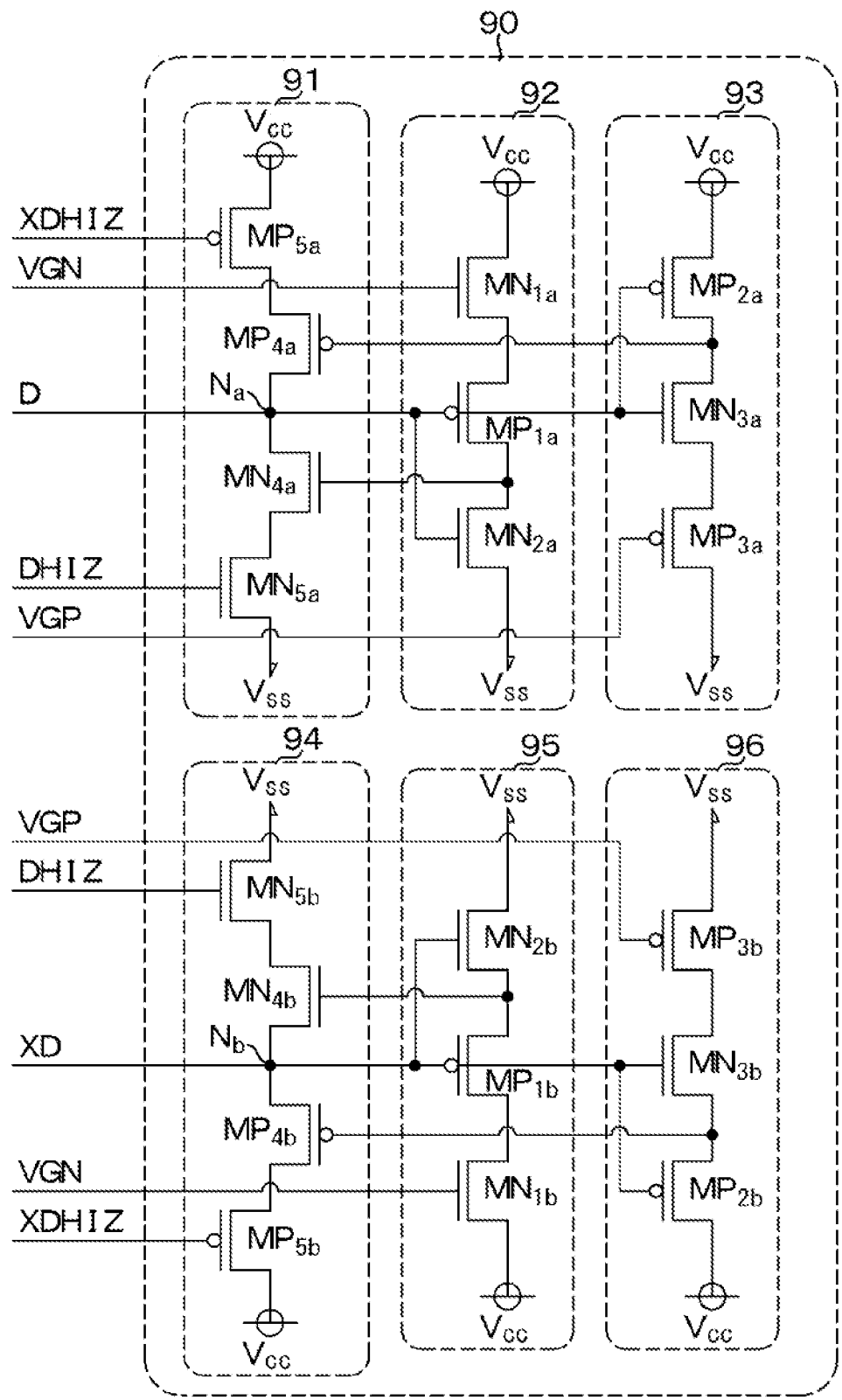
FIG. 9 is a circuit diagram showing a circuit example of an auxiliary drive circuit according to Example 2.

Example 2 is a variation of Example 1. A dedicated drive signal is used in Example 2. FIG. 9 shows a circuit example of an auxiliary drive circuit 90 according to Example 2. Respective circuit configurations of an input circuit 91, an inverter circuit 92, and an inverter circuit 93 of a positive-phase side circuit section 97, and respective circuit configurations of an input circuit 94, an inverter circuit 95, and an inverter circuit 96 of a negative-phase side circuit section 98 are the same as those in Example 1.

In Example 1, the negative-phase data signal XD is used as a drive signal for the transistor $MN_{1a}$ of the inverter circuit 92 and the transistor $MP_{3a}$ of the inverter circuit 93 of the positive-phase side circuit section 97. Furthermore, the positive-phase data signal D is used as a drive signal for the transistor $MN_{1b}$ of the inverter circuit 95 and the transistor $MP_{3b}$ of the inverter circuit 96 of the negative-phase side circuit section 98.

Meanwhile, in Example 2, dedicated drive signals are used as drive signals for a transistor $MN_{1a}$, a transistor $MP_{3a}$, a transistor $MN_{1b}$, and a transistor $MP_{3b}$. Specifically, in the positive-phase side circuit section 97, the transistor $MN_{1a}$ of the inverter circuit 92 is driven by a first drive signal VGN, and the transistor $MP_{3a}$ of the inverter circuit 93 is driven by a second drive signal VGP. Furthermore, in the negative-phase side circuit section 98, the transistor $MN_{1b}$ of the inverter circuit 95 is driven by the first drive signal VGN, and the transistor $MP_{3b}$ of the inverter circuit 96 is driven by the second drive signal VGP.

The auxiliary drive circuit 90 according to Example 2 with the configuration described above detects in terms of a circuit that a potential VD of a data line 22 and a potential VXD of a data line 23 satisfy the following conditions, and operates to amplify a potential difference between a positive-phase data signal D and a negative-phase data signal XD.

When VD>VXD:

$$VD > VGP + Vth_{\_a2}, \text{ or } VXD < VGN - Vth_{\_b1}.$$

Here, the following hold:

$$Vth_{\_a2} = Vth_{p3a} + Vth_{n3a},$$

$$Vth_{\_b1} = Vth_{p1b} + Vth_{n1b},$$

where $Vth_{p3a}$ and $Vth_{n3a}$ are respective threshold voltages of the transistors $MP_{3a}$ and $MN_{3a}$ in the inverter circuit 93 of the positive-phase side circuit section 97, and $Vth_{p1b}$ and $Vth_{n1b}$ are respective threshold voltages of the transistors $MP_{1b}$ and $MN_{1b}$ in the inverter circuit 95 of the negative-phase side circuit section 98.

When VD<VXD:

$$VXD > VGP + Vth_{\_b2}, \text{ or } VD < VGN - Vth_{\_a1}.$$

Here, the following hold:

$$Vth_{\_a1} = Vth_{p1a} + Vth_{n1a},$$

$$Vth_{\_b2} = Vth_{p3b} + Vth_{n3b},$$

where $Vth_{p1a}$ and $Vth_{n1a}$ are respective threshold voltages of the transistors $MP_{1a}$ and $MN_{1a}$ in the inverter circuit 92 of the positive-phase side circuit section 97, and $Vth_{p3b}$ and $Vth_{n3b}$ are respective threshold voltages of the transistors $MP_{3b}$ and $MN_{3b}$ in the inverter circuit 96 of the negative-phase side circuit section 98.

Figure 10:
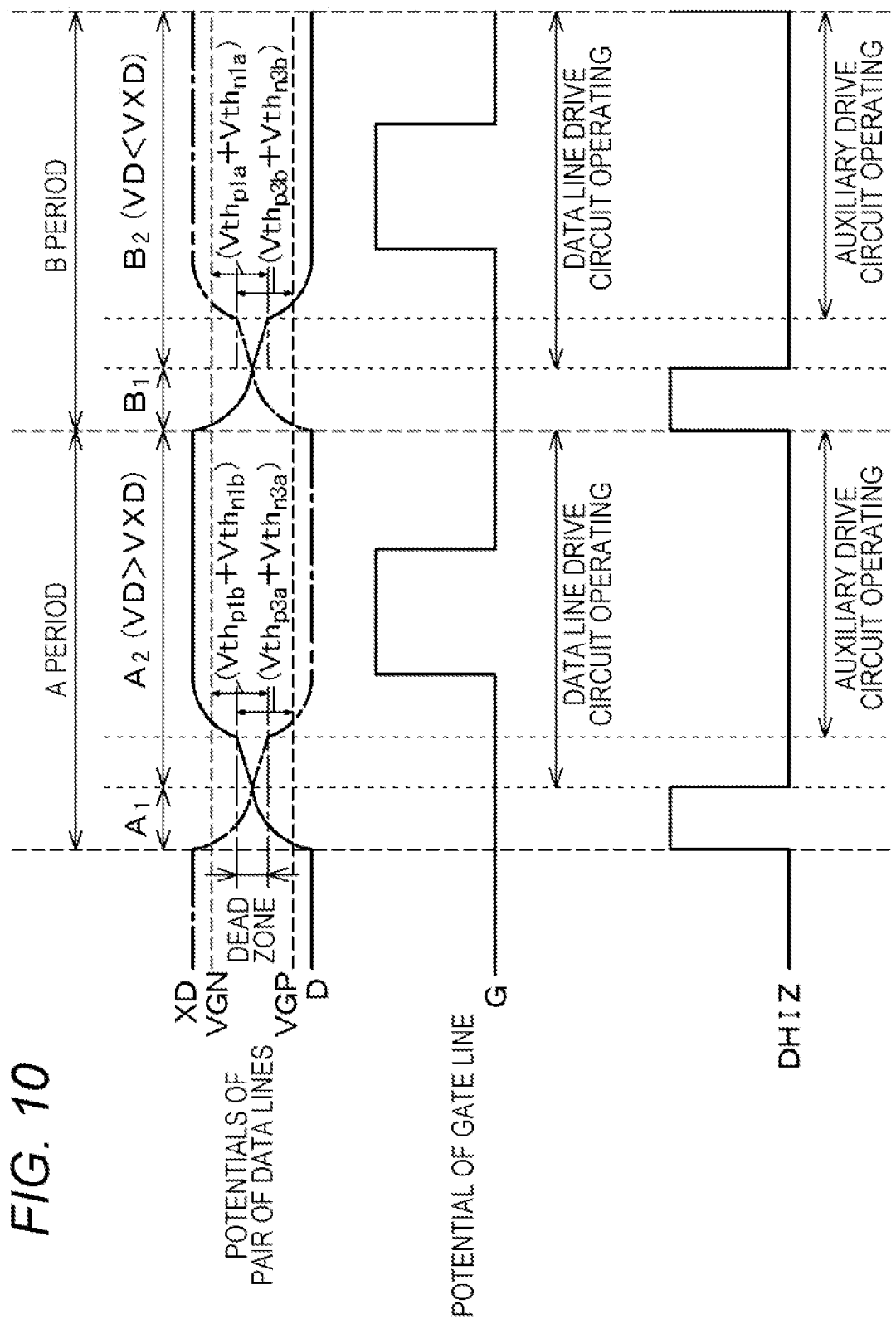
FIG. 10 is a waveform diagram for illustrating circuit operation of the auxiliary drive circuit according to Example 2.

In the auxiliary drive circuit 90 according to Example 2, it is possible to set a dead zone in any desired voltage range by setting the first drive signal VGN and the second drive signal VGP. FIG. 10 is a waveform diagram for illustrating circuit operation of the auxiliary drive circuit 90 according to Example 2. The waveform diagram shows waveforms of the potentials of a pair of the data lines 22/23, the first drive signal VGN, the second drive signal VGP, the potential of a gate line 21, and a drive signal DHIZ.

Example 3

Figure 11:
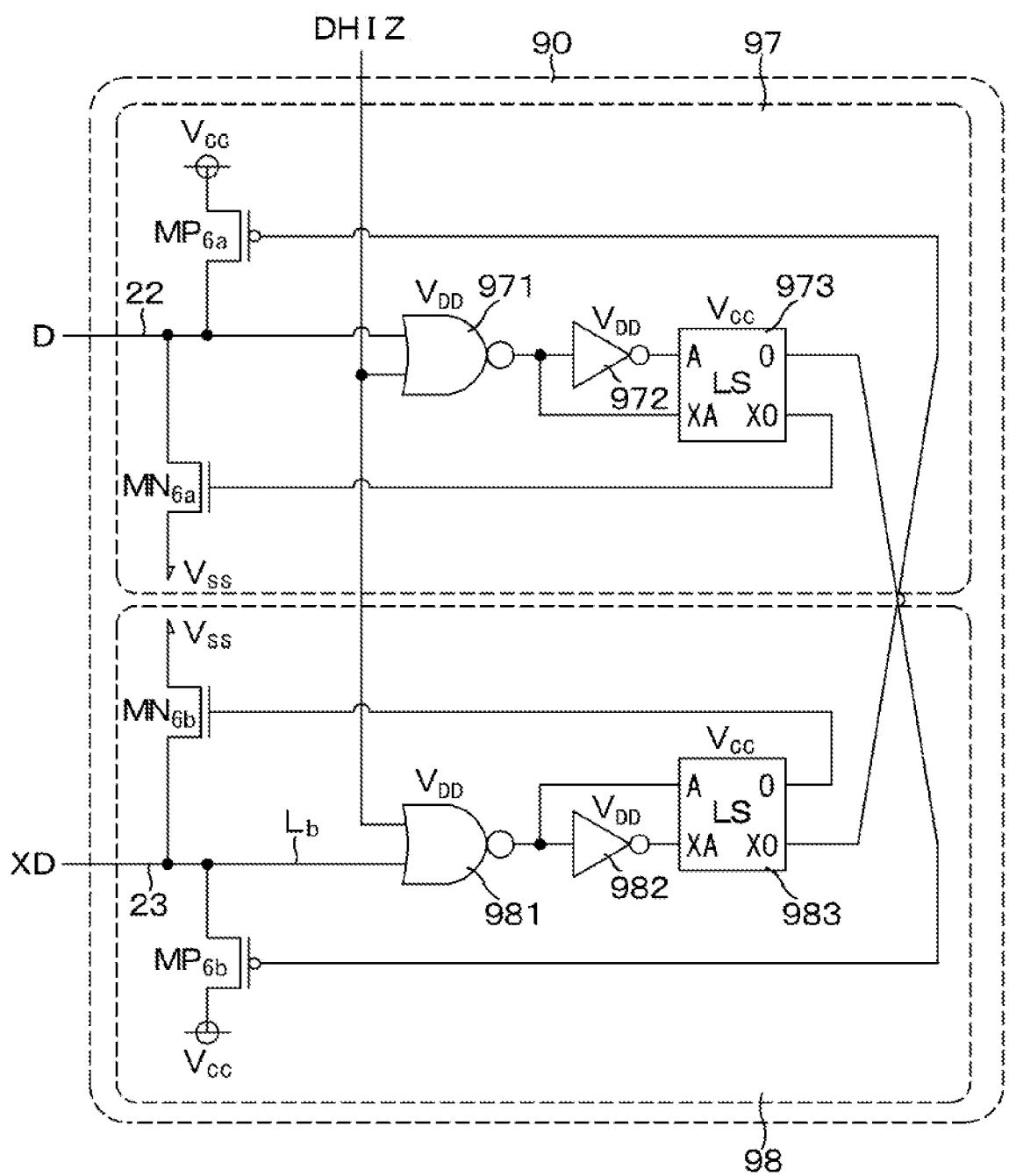
FIG. 11 is a block diagram showing a circuit example of an auxiliary drive circuit according to Example 3.

Example 3 is an example in which two power supply potentials of power supply voltage $V_{cc}$ and power supply voltage $V_{DD}$, which is equal to or lower than $V_{cc}/2$, are used as power supply voltages of an auxiliary drive circuit 90. The power supply voltage $V_{DD}$ may be generated in a display device or may be supplied from outside the display device. FIG. 11 shows a circuit example of the auxiliary drive circuit 90 according to Example 3.

The auxiliary drive circuit 90 includes a positive-phase side circuit section 97 for a positive-phase data signal D and a negative-phase side circuit section 98 for a negative-phase data signal XD.

The positive-phase side circuit section 97 has a circuit configuration that includes a P-channel transistor $MP_{6a}$, an N-channel transistor $MN_{6a}$, a NOR circuit 971, an inverter circuit 972, and a level shift (LS) circuit 973.

The P-channel transistor $MP_{6a}$ is connected to a node of the power supply voltage $V_{cc}$ and a data line 22 of the positive-phase data signal D while being located between the node and the data line 22. The N-channel transistor $MN_{6a}$ is connected to the data line 22 and a node of power supply voltage $V_{ss}$ while being located between the data line 22 and the node. The NOR circuit 971 has two inputs of the positive-phase data signal D and a drive signal DHIZ. The inverter circuit 972 inverts the output of the NOR circuit 971. The level shift circuit 973 uses the output of the inverter circuit 972 as positive-phase input A, and the output of the NOR circuit 971 as negative-phase input XA.

In the positive-phase side circuit section 97 having the configuration described above, the NOR circuit 971 and the inverter circuit 972 operate at the power supply voltage $V_{DD}$, and the level shift circuit 973 operates at the power supply voltage $V_{cc}$. Accordingly, the level shift circuit 973 shifts H level of the output of the NOR circuit 971 and the inverter circuit 972 from the level of $V_{DD}$ to the level of $V_{cc}$.

The negative-phase side circuit section 98 has a circuit configuration that includes an N-channel transistor $MN_{6b}$, a P-channel transistor $MP_{6b}$, a NOR circuit 981, an inverter circuit 982, and a level shift circuit 983.

The N-channel transistor $MN_{6b}$ is connected to the node of the power supply voltage $V_{ss}$ and a data line 23 of the negative-phase data signal XD while being located between the node and the data line 23. The P-channel transistor $MP_{6b}$ is connected to the data line 23 and the node of the power supply voltage $V_{cc}$ while being located between the data line 23 and the node. The NOR circuit 981 has two inputs of the negative-phase data signal XD and the drive signal DHIZ. The inverter circuit 982 inverts the output of the NOR circuit 981. The level shift circuit 983 uses the output of the NOR circuit 971 as positive-phase input A, and the output of the inverter circuit 982 as negative-phase input XA.

In the negative-phase side circuit section 98 having the configuration described above, the NOR circuit 981 and the inverter circuit 982 operate at the power supply voltage $V_{DD}$, and the level shift circuit 983 operates at the power supply voltage $V_{cc}$. As a result, the level shift circuit 983 shifts H level of the output of the NOR circuit 981 and the inverter circuit 982 from the level of $V_{DD}$ to the level of $V_{cc}$.

The level shift circuit 973 of the positive-phase side circuit section 97 provides positive-phase output O as the gate input of the P-channel transistor $MP_{6b}$ of the negative-phase side circuit section 98, and provides negative-phase output XO as the gate input of the N-channel transistor $MN_{6a}$ of the positive-phase side circuit section 97. The level shift circuit 983 of the negative-phase side circuit section 98 provides positive-phase output O as the gate input of the N-channel transistor $MN_{6b}$ of the negative-phase side circuit section 98, and provides negative-phase output XO as the gate input of the P-channel transistor $MP_{6a}$ of the positive-phase side circuit section 97.

The auxiliary drive circuit 90 according to Example 3 with the configuration described above does not start to operate immediately after the drive signal DHIZ has made a transition from H level to L level. This is because the power supply voltage $V_{DD}$ is set to a voltage value equal to or lower than $V_{cc}/2$. Then, the auxiliary drive circuit 90 starts to operate in such a way as to amplify a difference between a potential VD of the data line 22 and a potential VXD of the data line 23 at a time point where the potential VD of the data line 22 falls below logic threshold $Vth_{nor\_a}$ of the NOR circuit 971 or at a time point where the potential VXD of the data line 23 falls below logic threshold $Vth_{nor\_b}$ of the NOR circuit 971.

Figure 12:
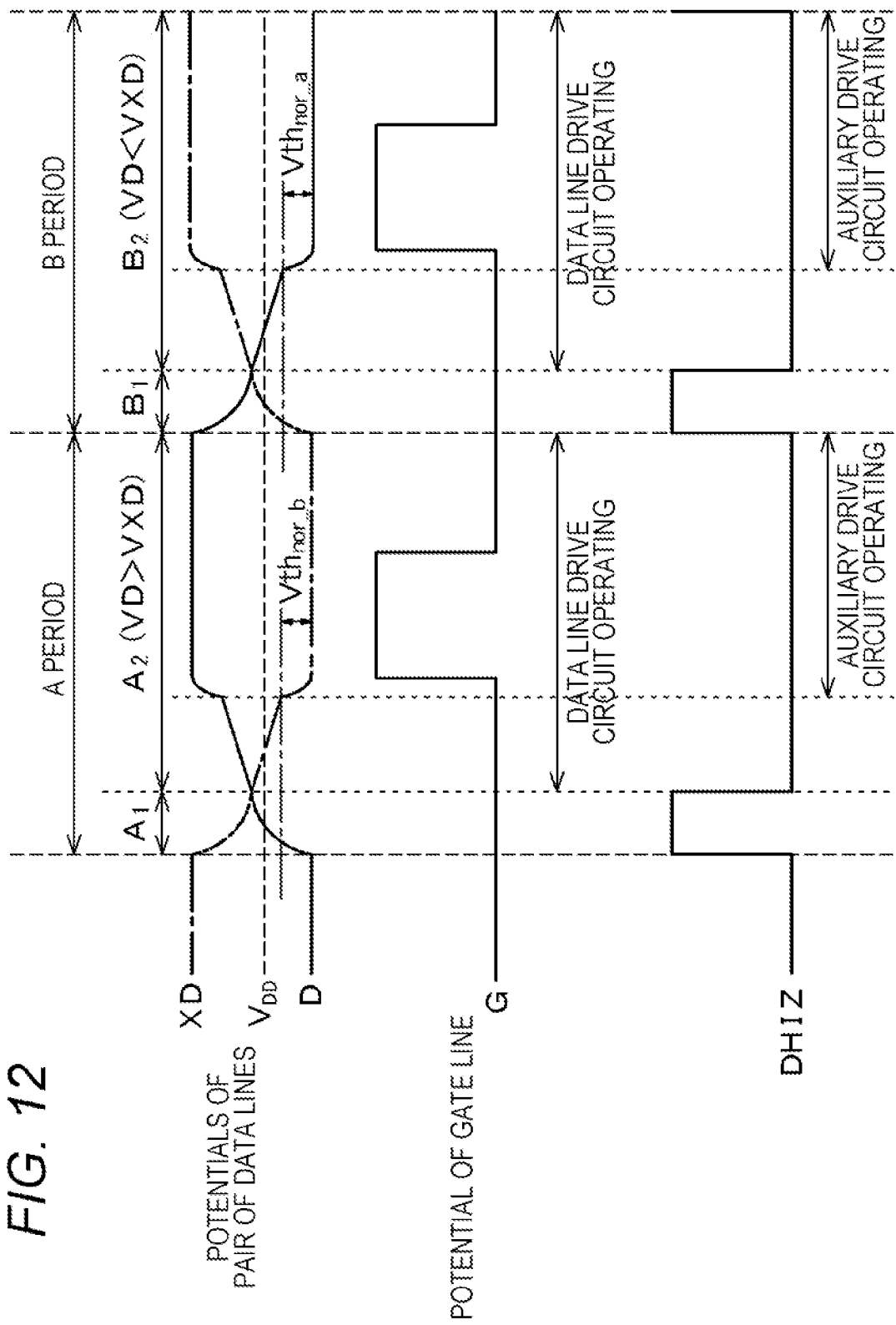
FIG. 12 is a waveform diagram for illustrating circuit operation of the auxiliary drive circuit according to Example 3.

FIG. 12 is a waveform diagram for illustrating circuit operation of the auxiliary drive circuit 90 according to Example 3. The waveform diagram shows waveforms of the potentials of a pair of the data lines 22/23, the potential of a gate line 21, and the drive signal DHIZ.

When VD>VXD, the auxiliary drive circuit 90 starts to operate at a time point where the potential VD of the data line 22 falls below the logic threshold $Vth_{nor\_a}$ of the NOR circuit 971.

When VD<VXD, the auxiliary drive circuit 90 starts to operate at a time point where the potential VXD of the data line 23 falls below the logic threshold $Vth_{nor\_b}$ of the NOR circuit 981.

<Variation>

The present disclosure has been described above on the basis of the preferred embodiment. However, the present disclosure is not limited to the embodiment. The configuration and structure of the display device described in the embodiment are merely examples, and can be changed as appropriate. The case where the technology of the present disclosure is applied to a liquid crystal display device has been described as an example in the above embodiment. However, the technology of the present disclosure is not limited to the application to a liquid crystal display device, and can be applied to general digital drive type display devices in which video signals are written to the pixels 10 through a pair of data lines provided for each pixel column.

Furthermore, the following configuration has been described in the above embodiment. While the data line drive circuit 40 is disposed on one end side of the data lines 22/23 of the data line group, the auxiliary drive circuit 90 is disposed on the other end side of each data line 22/23. However, this is just an example, and the configuration of the display device according to the present disclosure is not limited to this configuration. For example, the auxiliary drive circuit 90 may be further disposed at an intermediate part between the one end side and the other end side of each data line 22/23. Alternatively, the number of the auxiliary drive circuits 90 to be disposed for respective pixel columns may be further increased. In short, other configurations may be adopted as long as at least one auxiliary drive circuit 90 is provided for each pair of the data lines 22/23, that is, for each pixel column. Then, as the number of the auxiliary drive circuits 90 to be disposed for each pixel column increases, greater operation and effect can be achieved as a result of providing the auxiliary drive circuits 90.

Furthermore, an example of the display device including the short circuit 60 that selectively short-circuits the pair of data lines 22/23 has been cited in describing the technology of the present disclosure in the above embodiment. However, even a display device including no short circuit 60 can achieve the operation and effect derived from providing the auxiliary drive circuit 90. That is, the auxiliary drive circuit has a dead zone in a region where there is no difference between a positive-phase potential and a negative-phase potential, or where the difference in potential is smaller than a predetermined value. As a result, it is possible to prevent generation of unnecessary idling current/through current in a situation where there is no potential difference between a pair of data lines or the potential difference is small.

<Electronic Apparatus of Present Disclosure>

The display device of the present disclosure described above can be used as a display unit (display device) of an electronic apparatus in any field, which displays a video signal input to the electronic apparatus or a video signal generated in the electronic apparatus as an image or video. As an example, the display device of the present disclosure can be used as a display unit of a projection display device (projector), a television set, a digital still camera, a video camera, a personal computer, a portable terminal device such as a mobile phone, or the like.

The display device of the present disclosure also includes the one in a module shape having a sealed configuration. As an example, such a display device corresponds to a display module including a pixel array section to which a facing portion of transparent glass or the like is attached. Note that the display module may be provided with a circuit section, a flexible printed circuit (FPC), or the like for inputting/outputting a signal and the like from the outside to the pixel array section. Hereinafter, a projection display device (projector) will be described as a specific example of an electronic apparatus using the display device of the present disclosure. However, the specific example illustrated here is merely an example, and the electronic apparatus is not limited thereto.

[Projection Display Device]

Figure 13:
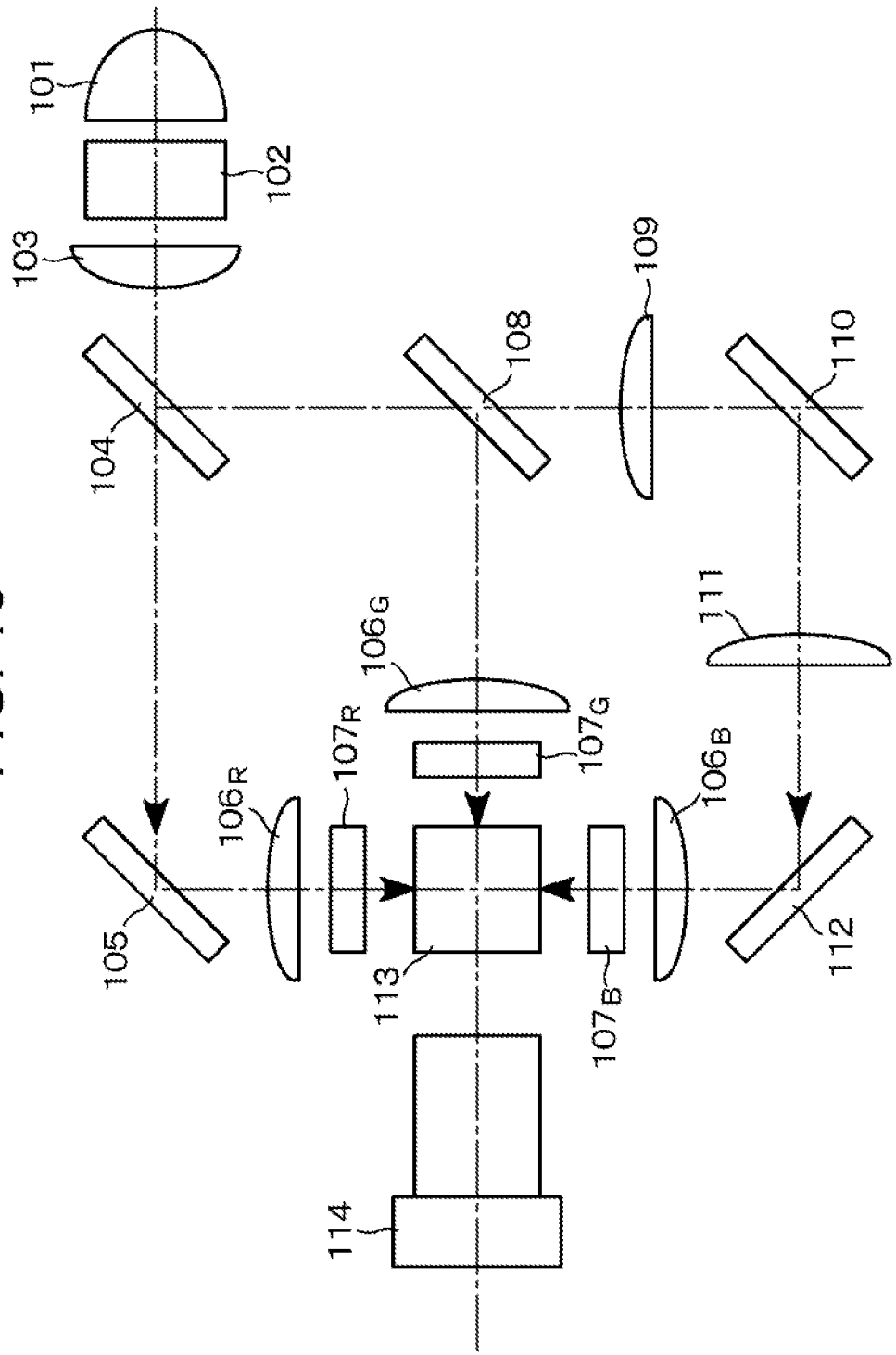
FIG. 13 is a configuration diagram schematically showing an optical system of a three-panel projection display device using a liquid crystal display device (liquid crystal panel) of the present disclosure.

FIG. 13 is a configuration diagram schematically showing an optical system of, for example, a three-panel projection display device using the display device (liquid crystal panel) of the present disclosure.

In FIG. 13, white light emitted from a light source 101 such as a white lamp is converted from P-polarized light to S-polarized light by a polarization conversion element 102, and is then incident on a dichroic mirror 104 after illumination is made uniform by a fly-eye lens 103. Then, only a specific color component, for example, a red (R) light component passes through the dichroic mirror 104, and light components of the rest of colors are reflected by the dichroic mirror 104. The R light component having passed through the dichroic mirror 104 has its optical path changed by a mirror 105, and then enters a liquid crystal panel 107R for R through a lens 106R.

For example, with respect to the light components reflected by the dichroic mirror 104, a green (G) light component is reflected by a dichroic mirror 108, and a blue (B) light component passes through the dichroic mirror 108. The G light component reflected by the dichroic mirror 108 enters a liquid crystal panel 107G for G through a lens 106G. The B light component having passed through the dichroic mirror 108 then passes through a lens 109 to be changed in optical path by a mirror 110. Then, the B light component passes through a lens 111 to be further changed in optical path by a mirror 112, and enters a liquid crystal panel 107B for B through a lens 106B.

Note that although not shown in FIG. 13, polarizing plates are disposed on the respective incident side and exit side of the liquid crystal panels 107R, 107G, and 107B. As is well known, it is possible to set a normally white mode by installing a pair of polarizing plates on the incident side and the exit side such that polarization directions thereof are perpendicular to each other (crossed Nicols). In addition, it is possible to set a normally black mode by installing the pair of polarizing plates such that the polarization directions thereof are parallel to each other (parallel Nicols).

The R, G, and B light components having passed through the liquid crystal panels 107R, 107G, and 107B, respectively, are combined in a dichroic prism 113. Then, the light combined by the dichroic prism 113 is incident on a projection lens 114, and is projected on a screen (not shown) by the projection lens 114.

In the three-panel projection display device having the configuration described above, the display device (display panel/liquid crystal panel) according to the above-described embodiment can be used as the liquid crystal panels 107R, 107G, and 107B to serve as light modulation means (light valves). Then, when being used as the light modulation means in the projection display device, the display device according to the above-described embodiment can prevent a decrease in the speed of driving pixels located away from the data line drive circuit and achieve the driving of pixels at a uniform speed over the entire display unit. This can contribute to improvement in display quality of the projection display device.

<Configurations that Present Disclosure can Adopt>

The present disclosure can also adopt the following configurations.

<<A. Display Device>>

[A-1] A display device including:

a pixel array section that includes pixels arranged in a matrix;

a data line group that includes a pair of data lines provided for each pixel column;

a data line drive circuit that supplies a positive-phase data signal to one of the pair of data lines, and supplies a negative-phase data signal to the other of the pair of data lines, the negative-phase data signal being opposite in phase to the positive-phase data signal; and an auxiliary drive circuit that is provided for each pair of data lines, and processes the positive-phase data signal and the negative-phase data signal supplied from the data line drive circuit to the pair of data lines, in which the auxiliary drive circuit has a dead zone in a region where there is no difference between a positive-phase potential and a negative-phase potential, or where the difference in potential is smaller than a predetermined value.

[A-2] The display device according to [A-1] above, in which at least one auxiliary drive circuit is provided for each pair of data lines.

[A-3] The display device according to [A-2] above, in which the data line drive circuit is disposed on one end side of the data lines of the data line group, and the auxiliary drive circuit is disposed at least on the other end side of each data line of the data line group.

[A-4] The display device according to [A-3] above, in which
the auxiliary drive circuit is disposed at an intermediate part between the one end and the other end of each data line of the data line group.

[A-5] The display device according to any one of [A-1] to [A-3] above, in which
the auxiliary drive circuit includes a positive-phase side circuit section for the positive-phase data signal and a negative-phase side circuit section for the negative-phase data signal.

[A-6] The display device according to [A-5] above, in which
the positive-phase side circuit section and the negative-phase side circuit section each include a preceding-stage inverter circuit and a subsequent-stage inverter circuit, and
when VD>VXD, the auxiliary drive circuit detects the following condition in terms of a circuit, and operates to amplify a difference between a potential VD and a potential VXD:

$$VD>VXD+Vth_{\_b1}, \text{ or } VD>VXD+Vth_{\_a2},$$

where VD is a potential of the data line to which the positive-phase data signal is supplied, VXD is a potential of the data line to which the negative-phase data signal is supplied, $Vth_{\_L}$ is a threshold value for a transistor included in the subsequent-stage inverter circuit of the positive-phase side circuit section, and $Vth_{\_b1}$ is a threshold value for a transistor included in the preceding-stage inverter circuit of the negative-phase side circuit section.

[A-7] The display device according to [A-6] above, in which
when VD<VXD, the auxiliary drive circuit detects the following condition in terms of a circuit, and operates to amplify the difference between the potential VD and the potential VXD:

$$VD<VXD-Vth_{\_a1}, \text{ or } VD<VXD-Vth_{\_b2},$$

where $Vth_{\_a1}$ is a threshold value for a transistor included in the preceding-stage inverter circuit of the positive-phase side circuit section, and $Vth_{\_b2}$ is a threshold value for a transistor included in the subsequent-stage inverter circuit of the negative-phase side circuit section.

[A-8] The display device according to [A-5] above, in which
the positive-phase side circuit section and the negative-phase side circuit section each include a preceding-stage inverter circuit to be driven by a first drive signal and a subsequent-stage inverter circuit to be driven by a second drive signal, and
when VD>VXD, the auxiliary drive circuit detects the following condition in terms of a circuit, and operates to amplify a difference between a potential VD and a potential VXD:

$$VD>VGP+Vth_{\_a2}, \text{ or } VXD<VGN-Vth_{\_b1},$$

where VD is a potential of the data line to which the positive-phase data signal is supplied, VXD is a potential of the data line to which the negative-phase data signal is supplied, VGN is the first drive signal, VGP is the second drive signal, $Vth_{\_a2}$ is a threshold value for a transistor included in the subsequent-stage inverter circuit of the positive-phase side circuit section, and $Vth_{\_b1}$ is a threshold value for a transistor included in the preceding-stage inverter circuit of the negative-phase side circuit section.

[A-9] The display device according to [A-8] above, in which
when VD<VXD, the auxiliary drive circuit detects the following condition in terms of a circuit, and operates to amplify the difference between the potential VD and the potential VXD:

$$VXD>VGP+Vth_{\_b2}, \text{ or } VD<VGN-Vth_{\_a1},$$

where $Vth_{\_a1}$ is a threshold value for a transistor included in the preceding-stage inverter circuit of the positive-phase side circuit section, and $Vth_{\_b2}$ is a threshold value for a transistor included in the subsequent-stage inverter circuit of the negative-phase side circuit section.

[A-10] The display device according to [A-5] above, in which
the auxiliary drive circuit uses a first power supply voltage and a second power supply voltage having a voltage value equal to or lower than ½ of the first power supply voltage,
the positive-phase side circuit section and the negative-phase side circuit section each include:
a NOR circuit that operates at the second power supply voltage, and receives the positive-phase data signal/negative-phase data signal and a predetermined drive signal as inputs; and
a level shift circuit that operates at the first power supply voltage, and shifts a high level of output of the NOR circuit from a level of the second power supply voltage to a level of the first power supply voltage, and
when VD>VXD, the auxiliary drive circuit starts to operate at a time point where a potential VD of the data line falls below a logic threshold of the NOR circuit of the positive-phase side circuit section.

[A-11] The display device according to [A-10] above, in which
when VD<VXD, the auxiliary drive circuit starts to operate at a time point where a potential VXD of the data line falls below a logic threshold of the NOR circuit of the negative-phase side circuit section.

[A-12] The display device according to any one of [A-11] to [A-11] above, further including:
a short circuit that is provided for each pair of data lines and selectively short-circuits the pair of data lines.

[A-13] The display device according to [A-12] above, in which
the short circuit temporarily short-circuits the pair of data lines before the positive-phase data signal and the negative-phase data signal are supplied from the data line drive circuit to the pair of data lines, and releases the short circuit between the pair of data lines after setting a potential between the pair of data lines to an intermediate potential between the positive-phase potential and the negative-phase potential.

[A-14] The display device according to [A-13] above, in which
before the short circuit short-circuits the pair of data lines, the data line drive circuit puts an output terminal corresponding to the pair of data lines in a high-impedance state, and supplies at least one of the positive-phase data signal or the negative-phase data signal to the pair of data lines after the short circuit releases the short circuit between the pair of data lines.

[A-15] The display device according to [A-13] or [A-14] above, in which the auxiliary drive circuit operates to hold the positive-phase data signal and the negative-phase data signal in synchronization with the short-circuit operation of the short circuit.

<<B. Electronic Apparatus>>

[B-1] An electronic apparatus including:

a display device that includes:

a pixel array section that includes pixels arranged in a matrix;

a data line group that includes a pair of data lines provided for each pixel column;

a data line drive circuit that supplies a positive-phase data signal to one of the pair of data lines, and supplies a negative-phase data signal to the other of the pair of data lines, the negative-phase data signal being opposite in phase to the positive-phase data signal; and an auxiliary drive circuit that is provided for each pair of data lines, and processes the positive-phase data signal and the negative-phase data signal supplied from the data line drive circuit to the pair of data lines, in which the auxiliary drive circuit has a dead zone in a region where there is no difference between a positive-phase potential and a negative-phase potential, or where the difference in potential is smaller than a predetermined value.

[B-2] The electronic apparatus according to [B-1] above, in which at least one auxiliary drive circuit is provided for each pair of data lines.

[B-3] The electronic apparatus according to [B-2] above, in which the data line drive circuit is disposed on one end side of the data lines of the data line group, and the auxiliary drive circuit is disposed at least on the other end side of each data line of the data line group.

[B-4] The electronic apparatus according to [B-3] above, in which the auxiliary drive circuit is disposed at an intermediate part between the one end and the other end of each data line of the data line group.

[B-5] The electronic apparatus according to any one of [B-1] to [B-3] above, in which the auxiliary drive circuit includes a positive-phase side circuit section for the positive-phase data signal and a negative-phase side circuit section for the negative-phase data signal.

[B-6] The electronic apparatus according to [B-5] above, in which the positive-phase side circuit section and the negative-phase side circuit section each include a preceding-stage inverter circuit and a subsequent-stage inverter circuit, and when VD>VXD, the auxiliary drive circuit detects the following condition in terms of a circuit, and operates to amplify a difference between a potential VD and a potential VXD:

$$VD > VXD + Vth_{\_b1}, \text{ or } VD > VXD + Vth_{\_a2},$$

where VD is a potential of the data line to which the positive-phase data signal is supplied, VXD is a potential of the data line to which the negative-phase data signal is supplied, $Vth_{\_a2}$ is a threshold value for a transistor included in the subsequent-stage inverter circuit of the positive-phase side circuit section, and $Vth_{\_b1}$ is a threshold value for a transistor included in the preceding-stage inverter circuit of the negative-phase side circuit section.

[B-7] The electronic apparatus according to [B-6] above, in which when VD<VXD, the auxiliary drive circuit detects the following condition in terms of a circuit, and operates to amplify the difference between the potential VD and the potential VXD:

$$VD < VXD - Vth_{\_a1}, \text{ or } VD < VXD - Vth_{\_b2},$$

where $Vth_{\_a1}$ is a threshold value for a transistor included in the preceding-stage inverter circuit of the positive-phase side circuit section, and $Vth_{\_b2}$ is a threshold value for a transistor included in the subsequent-stage inverter circuit of the negative-phase side circuit section.

[B-8] The electronic apparatus according to [B-5] above, in which the positive-phase side circuit section and the negative-phase side circuit section each include a preceding-stage inverter circuit to be driven by a first drive signal and a subsequent-stage inverter circuit to be driven by a second drive signal, and when VD>VXD, the auxiliary drive circuit detects the following condition in terms of a circuit, and operates to amplify a difference between a potential VD and a potential VXD:

$$VD > VGP + Vth_{\_a2}, \text{ or } VXD < VGN - Vth_{\_b1},$$

where VD is a potential of the data line to which the positive-phase data signal is supplied, VXD is a potential of the data line to which the negative-phase data signal is supplied, VGN is the first drive signal, VGP is the second drive signal, $Vth_{\_a2}$ is a threshold value for a transistor included in the subsequent-stage inverter circuit of the positive-phase side circuit section, and $Vth_{\_b1}$ is a threshold value for a transistor included in the preceding-stage inverter circuit of the negative-phase side circuit section.

[B-9] The electronic apparatus according to [B-8] above, in which when VD<VXD, the auxiliary drive circuit detects the following condition in terms of a circuit, and operates to amplify the difference between the potential VD and the potential VXD:

$$VXD > VGP + Vth_{\_b2}, \text{ or } VD < VGN - Vth_{\_a1},$$

where $Vth_{\_a1}$ is a threshold value for a transistor included in the preceding-stage inverter circuit of the positive-phase side circuit section, and $Vth_{\_b2}$ is a threshold value for a transistor included in the subsequent-stage inverter circuit of the negative-phase side circuit section.

[B-10] The electronic apparatus according to [B-5] above, in which the auxiliary drive circuit uses a first power supply voltage and a second power supply voltage having a voltage value equal to or lower than ½ of the first power supply voltage, the positive-phase side circuit section and the negative-phase side circuit section each include:

a NOR circuit that operates at the second power supply voltage, and receives the positive-phase data signal/negative-phase data signal and a predetermined drive signal as inputs; and a level shift circuit that operates at the first power supply voltage, and shifts a high level of output of the NOR circuit from a level of the second power supply voltage to a level of the first power supply voltage, and when VD>VXD, the auxiliary drive circuit starts to operate at a time point where a potential VD of the data line falls below a logic threshold of the NOR circuit of the positive-phase side circuit section.

[B-11] The electronic apparatus according to [B-10] above, in which when VD<VXD, the auxiliary drive circuit starts to operate at a time point where a potential VXD of the data line falls below a logic threshold of the NOR circuit of the negative-phase side circuit section.

[B-12] The electronic apparatus according to any one of [B-1] to [B-11] above, further including:

a short circuit that is provided for each pair of data lines and selectively short-circuits the pair of data lines.

[B-13] The electronic apparatus according to [B-12] above, in which the short circuit temporarily short-circuits the pair of data lines before the positive-phase data signal and the negative-phase data signal are supplied from the data line drive circuit to the pair of data lines, and releases the short circuit between the pair of data lines after setting a potential between the pair of data lines to an intermediate potential between the positive-phase potential and the negative-phase potential.

[B-14] The electronic apparatus according to [B-13] above, in which before the short circuit short-circuits the pair of data lines, the data line drive circuit puts an output terminal corresponding to the pair of data lines in a high-impedance state, and supplies at least one of the positive-phase data signal or the negative-phase data signal to the pair of data lines after the short circuit releases the short circuit between the pair of data lines.

[B-15] The electronic apparatus according to [B-13] or [B-14] above, in which the auxiliary drive circuit operates to hold the positive-phase data signal and the negative-phase data signal in synchronization with the short-circuit operation of the short circuit.

REFERENCE SIGNS LIST

10 Pixel
20 Pixel array section
21 ($21_1$ to $21_m$) Gate line
22/23 ($22_1/23_1$ to $22_n/23_n$) Pair of data lines
30 Gate line drive circuit
40, 40A, 40B Data line drive circuit
50 Signal line
60 ($60_1$ to $60_n$) Short circuit
70 Liquid crystal capacitor
80 ($80_1$ to $80_n$) Latch circuit
90 ($90_1$ to $90_n$) Auxiliary drive circuit
97 Positive-phase side circuit section
98 Negative-phase side circuit section
D ($D_1$ to $D_n$) Positive-phase data signal
XD ($XD_1$ to $XD_n$) Negative-phase data signal
G ($G_1$ to $G_m$) Gate signal (scanning signal)

What is claimed is:

1. A display device comprising:
a pixel array section that includes pixels arranged in a matrix;
a data line group that includes a pair of data lines provided for each pixel column;
a data line drive circuit that supplies a positive-phase data signal to one of the pair of data lines, and supplies a negative-phase data signal to another of the pair of data lines, the negative-phase data signal being opposite in phase to the positive-phase data signal; and
an auxiliary drive circuit that is provided for each pair of data lines, and processes the positive-phase data signal and the negative-phase data signal supplied from the data line drive circuit to the pair of data lines,
wherein the auxiliary drive circuit has a dead zone in a region where there is no difference between a positive-phase potential and a negative-phase potential, or where the difference in potential is smaller than a predetermined value.

2. The display device according to claim 1, wherein at least one auxiliary drive circuit is provided for each pair of data lines.

3. The display device according to claim 2, wherein the data line drive circuit is disposed on one end side of the data lines of the data line group, and
the auxiliary drive circuit is disposed at least on another end side of each data line of the data line group.

4. The display device according to claim 3, wherein the auxiliary drive circuit is disposed at an intermediate part between the one end and the another end of each data line of the data line group.

5. The display device according to claim 1, wherein the auxiliary drive circuit includes a positive-phase side circuit section for the positive-phase data signal and a negative-phase side circuit section for the negative-phase data signal.

6. The display device according to claim 5, wherein the positive-phase side circuit section and the negative-phase side circuit section each include a preceding-stage inverter circuit and a subsequent-stage inverter circuit, and
when VD>VXD, the auxiliary drive circuit detects a following condition in terms of a circuit, and operates to amplify a difference between a potential VD and a potential VXD:

$VD > VXD + Vth_{\_b1}$, or $VD > VXD + Vth_{\_a2}$, where VD is a potential of the data line to which the positive-phase data signal is supplied, VXD is a potential of the data line to which the negative-phase data signal is supplied, $Vth_{\_a2}$ is a threshold value for a transistor included in the subsequent-stage inverter circuit of the positive-phase side circuit section, and $Vth_{\_b1}$ is a threshold value for a transistor included in the preceding-stage inverter circuit of the negative-phase side circuit section.

7. The display device according to claim 6, wherein when VD<VXD, the auxiliary drive circuit detects a following condition in terms of a circuit, and operates to amplify the difference between the potential VD and the potential VXD:

$VD < VXD - Vth_{\_a1}$, or $VD < VXD - Vth_{\_b2}$, where $Vth_{\_a1}$ is a threshold value for a transistor included in the preceding-stage inverter circuit of the positive-phase side circuit section, and $Vth_{\_b2}$ is a threshold value for a transistor included in the subsequent-stage inverter circuit of the negative-phase side circuit section.

8. The display device according to claim 5, wherein the positive-phase side circuit section and the negative-phase side circuit section each include a preceding-stage inverter circuit to be driven by a first drive signal and a subsequent-stage inverter circuit to be driven by a second drive signal, and when VD>VXD, the auxiliary drive circuit detects a following condition in terms of a circuit, and operates to amplify a difference between a potential VD and a potential VXD:

$$VD > VGP + Vth_{\_a2}, \text{ or } VXD < VGN - Vth_{\_b1},$$

where VD is a potential of the data line to which the positive-phase data signal is supplied, VXD is a potential of the data line to which the negative-phase data signal is supplied, VGN is the first drive signal, VGP is the second drive signal, $Vth_{\_a2}$ is a threshold value for a transistor included in the subsequent-stage inverter circuit of the positive-phase side circuit section, and $Vth_{\_b1}$ is a threshold value for a transistor included in the preceding-stage inverter circuit of the negative-phase side circuit section.

9. The display device according to claim 8, wherein when VD<VXD, the auxiliary drive circuit detects a following condition in terms of a circuit, and operates to amplify the difference between the potential VD and the potential VXD:

$$VXD > VGP + Vth_{\_b2}, \text{ or } VD < VGN - Vth_{\_a1},$$

where $Vth_{\_a1}$ is a threshold value for a transistor included in the preceding-stage inverter circuit of the positive-phase side circuit section, and $Vth_{\_b2}$ is a threshold value for a transistor included in the subsequent-stage inverter circuit of the negative-phase side circuit section.

10. The display device according to claim 5, wherein the auxiliary drive circuit uses a first power supply voltage and a second power supply voltage having a voltage value equal to or lower than ½ of the first power supply voltage, the positive-phase side circuit section and the negative-phase side circuit section each include:

a NOR circuit that operates at the second power supply voltage, and receives the positive-phase data signal/ negative-phase data signal and a predetermined drive signal as inputs; and a level shift circuit that operates at the first power supply voltage, and shifts a high level of output of the NOR circuit from a level of the second power supply voltage to a level of the first power supply voltage, and when VD>VXD, the auxiliary drive circuit starts to operate at a time point where a potential VD of the data line falls below a logic threshold of the NOR circuit of the positive-phase side circuit section.

11. The display device according to claim 10, wherein when VD<VXD, the auxiliary drive circuit starts to operate at a time point where a potential VXD of the data line falls below a logic threshold of the NOR circuit of the negative-phase side circuit section.

12. The display device according to claim 1, further comprising:

a short circuit that is provided for each pair of data lines and selectively short-circuits the pair of data lines.

13. The display device according to claim 12, wherein the short circuit temporarily short-circuits the pair of data lines before the positive-phase data signal and the negative-phase data signal are supplied from the data line drive circuit to the pair of data lines, and releases the short circuit between the pair of data lines after setting a potential between the pair of data lines to an intermediate potential between the positive-phase potential and the negative-phase potential.

14. The display device according to claim 13, wherein before the short circuit short-circuits the pair of data lines, the data line drive circuit puts an output terminal corresponding to the pair of data lines in a high-impedance state, and supplies at least one of the positive-phase data signal or the negative-phase data signal to the pair of data lines after the short circuit releases the short circuit between the pair of data lines.

15. The display device according to claim 13, wherein the auxiliary drive circuit operates to hold the positive-phase data signal and the negative-phase data signal in synchronization with the short-circuit operation of the short circuit.

16. An electronic apparatus comprising:
a display device that includes:
a pixel array section that includes pixels arranged in a matrix;
a data line group that includes a pair of data lines provided for each pixel column;
a data line drive circuit that supplies a positive-phase data signal to one of the pair of data lines, and supplies a negative-phase data signal to another of the pair of data lines, the negative-phase data signal being opposite in phase to the positive-phase data signal; and
an auxiliary drive circuit that is provided for each pair of data lines, and processes the positive-phase data signal and the negative-phase data signal supplied from the data line drive circuit to the pair of data lines,
wherein the auxiliary drive circuit has a dead zone in a region where there is no difference between a positive-phase potential and a negative-phase potential, or where the difference in potential is smaller than a predetermined value.

\* \* \* \* \*